US012554207B2

(12) United States Patent
Oyamada et al.

(10) Patent No.: US 12,554,207 B2
(45) Date of Patent: Feb. 17, 2026

(54) ELECTROPHOTOGRAPHIC PHOTORECEPTOR, PROCESS CARTRIDGE, AND IMAGE FORMING APPARATUS

(71) Applicant: FUJIFILM Business Innovation Corp., Tokyo (JP)

(72) Inventors: Yuki Oyamada, Kanagawa (JP); Masahiro Iwasaki, Kanagawa (JP); Keisuke Kusano, Kanagawa (JP); Wataru Yamada, Kanagawa (JP); Tomoya Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 715 days.

(21) Appl. No.: 17/945,304

(22) Filed: Sep. 15, 2022

(65) Prior Publication Data

US 2023/0333493 A1 Oct. 19, 2023

(30) Foreign Application Priority Data

Mar. 7, 2022 (JP) ................................. 2022-034654

(51) Int. Cl.
*G03G 5/06* (2006.01)
*G03G 21/18* (2006.01)

(52) U.S. Cl.
CPC ......... *G03G 5/0651* (2013.01); *G03G 5/0607* (2013.01); *G03G 5/0648* (2013.01); *G03G 21/1814* (2013.01)

(58) Field of Classification Search
CPC .. G03G 5/0651; G03G 5/0607; G03G 5/0648; G03G 21/1814
See application file for complete search history.

(56) References Cited

U.S. PATENT DOCUMENTS 5,489,496 A * 2/1996 Katayama .............. G03G 5/144 430/65
5,795,690 A * 8/1998 Takegawa .............. G03G 5/142 430/62

(Continued)

FOREIGN PATENT DOCUMENTS

JP 05-249719 A 9/1993
JP 10-133407 A 5/1998

(Continued)

*Primary Examiner* — Peter L Vajda
*Assistant Examiner* — Boone Alexander Evans
(74) *Attorney, Agent, or Firm* — Sughrue Mion, PLLC

(57) ABSTRACT

An electrophotographic photoreceptor includes a conductive support; and an undercoat layer and a photosensitive layer stacked on the conductive support, in which the undercoat layer contains crystalline electron transport compound particles. In X-ray diffraction measurement performed on the undercoat layer in a thickness direction, a maximum intensity peak has a half-width of 5° or less, and a maximum value Nmax among orientation indices N expressed by equation (1) below is 1 or more and 3 or less:

$$\text{Orientation index} = \frac{\dfrac{I_1}{\sum I_1}}{\dfrac{I_2}{\sum I_2}} \tag{1}$$

where $I_1$ represents a relative integral intensity of each of peaks in the X-ray diffraction measurement performed on the undercoat layer in the thickness direction, and $I_2$ represents a relative integral intensity of each of peaks in X-ray diffraction measurement performed on the (Continued)

undercoat layer processed into a powder form having a volume-average particle diameter of 5μm or less.

17 Claims, 2 Drawing Sheets

(56) References Cited

U.S. PATENT DOCUMENTS

| | | | | |
|---|---|---|---|---|
| 10,241,429 | B2 | 3/2019 | Shimada et al. | |
| 2008/0176154 | A1* | 7/2008 | Gyoutoku .............. | G03G 5/144<br>430/59.1 |
| 2020/0096884 | A1* | 3/2020 | Iwasaki ................ | G03G 5/0575 |

FOREIGN PATENT DOCUMENTS

| | | | |
|---|---|---|---|
| JP | 2015-180923 | A | 10/2015 |
| JP | 2018-189957 | A | 11/2018 |
| JP | 2019-61219 | A | 4/2019 |

* cited by examiner

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2022-034654 filed Mar. 7, 2022.

BACKGROUND

(i) Technical Field

The present disclosure relates to an electrophotographic photoreceptor, a process cartridge, and an image forming apparatus.

(ii) Related Art

Japanese Unexamined Patent Application Publication No. 2018-189957 discloses an electrophotographic photoreceptor that includes, in the order of arrangement, a support, a charge generation layer that contains a hydroxygallium phthalocyanine pigment serving as a charge generation substance, and a charge transport layer that contains a charge transport substance, in which the charge generation layer has a thickness greater than 200 nm, the hydroxygallium phthalocyanine pigment has peaks at 7.4°±0.3° and 28.2°±0.3° (Bragg angle 2θ) in an X-ray diffraction spectrum taken by using Cuka radiation, and A determined from formula (1) from a peak angle $\theta_1$ [°] and an integral width $\beta_1$ [°] of the peak at 7.4°±0.3° and a peak angle $\theta_2$ [°] and an integral width $\beta_2$ [°] of the peak at 28.2°±0.3° is 0.8 or less.

$$A = \frac{\beta_1 \cos\theta_1}{\beta_2 \cos\theta_2} \quad (1)$$

Japanese Unexamined Patent Application Publication No. 5-249719 discloses an electrophotographic photoreceptor that includes a conductive support and a photosensitive layer containing a charge generation agent and disposed on the conductive support, in which the charge generation agent is obtained by purifying a benzimidazole perylene pigment represented by structural formula (I) or (II) below by sublimation, and dry-pulverizing the purified pigment, and the charge generation agent has a crystal form that has peaks at Bragg angles (2θ±0.2° of 6.2°, 12.3°, and 26.8° in X-ray diffraction measurement of a powder in an unoriented state taken by using Cuka radiation as a light source, and the half-width S(26.8°) at 26.8° satisfies S(26.8°)≥0.5.

(I) cis form

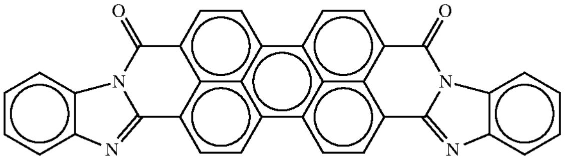

-continued (II) trans form

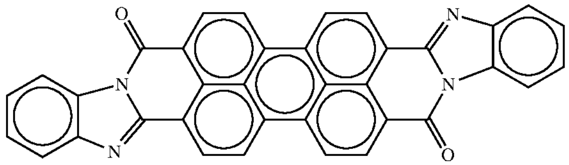

Japanese Unexamined Patent Application Publication No. 10-133407 discloses an electrophotographic photoreceptor that includes a conductive support, and an undercoat layer and a photosensitive layer stacked on the conductive support, in which the undercoat layer contains a binder resin and an alkali metal salt of trifluoromethanesulfonic acid.

Japanese Unexamined Patent Application Publication No. 2019-61219 discloses an electrophotographic photoreceptor that includes a support, an undercoat layer, and a photosensitive layer disposed in this order, in which the undercoat layer contains a binder resin and strontium titanate particles, and the strontium titanate particles have a maximum peak at 2θ=32.20±0.20 (θ denotes a Bragg angle) in an Cuka X-ray diffraction pattern, and the maximum peak has a half-width of 0.10 deg or more and 0.50 deg or less.

Japanese Unexamined Patent Application Publication No. 2015-180923 discloses an electrophotographic photoreceptor that includes an undercoat layer that contains a binder resin and composite particles, in which the composite particles contain core particles and tin oxide covering the core particles, the tin oxide constituting the composite particles has a peak at a Bragg angle (2θ±0.20°) of 33.90° in Cuka X-ray diffraction analysis, and the X-ray diffraction peak at a Bragg angle (2θ±0.20°) of 33.90° in Cukα X-ray diffraction analysis has a half-width of 1.41° or less.

SUMMARY

Aspects of non-limiting embodiments of the present disclosure relate to an electrophotographic photoreceptor having excellent chargeability and electron transport property compared to when the maximum intensity peak observed in X-ray diffraction measurement performed on the undercoat layer in the thickness direction has a half-width exceeding 5°, when the maximum value Nmax among the orientation indices N expressed by formula (1) below exceeds 3, or when the crystalline electron transport compound particles contained in the undercoat layer have an average aspect ratio exceeding 4.5.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an electrophotographic photoreceptor includes a conductive support; and an undercoat layer and a photosensitive layer stacked on the conductive support, in which the undercoat layer contains crystalline electron transport compound particles. In X-ray diffraction measurement performed on the undercoat layer in a thickness direction, a maximum intensity peak has a half-width of 5° or less, and a maximum value Nmax among orientation indices N expressed by equation (1) below is 1 or more and 3 or less:

$$\text{Orientation index} = \frac{\frac{I_1}{\sum I_1}}{\frac{I_2}{\sum I_2}} \tag{1}$$

where $I_1$ represents a relative integral intensity of each of peaks in the X-ray diffraction measurement performed on the undercoat layer in the thickness direction, and $I_2$ represents a relative integral intensity of each of peaks in X-ray diffraction measurement performed on the undercoat layer processed into a powder form having a volume-average particle diameter of 5 μm or less.

BRIEF DESCRIPTION OF THE DRAWINGS

Exemplary embodiments of the present disclosure will be described in detail based on the following figures, wherein.

DETAILED DESCRIPTION

Figure 1:
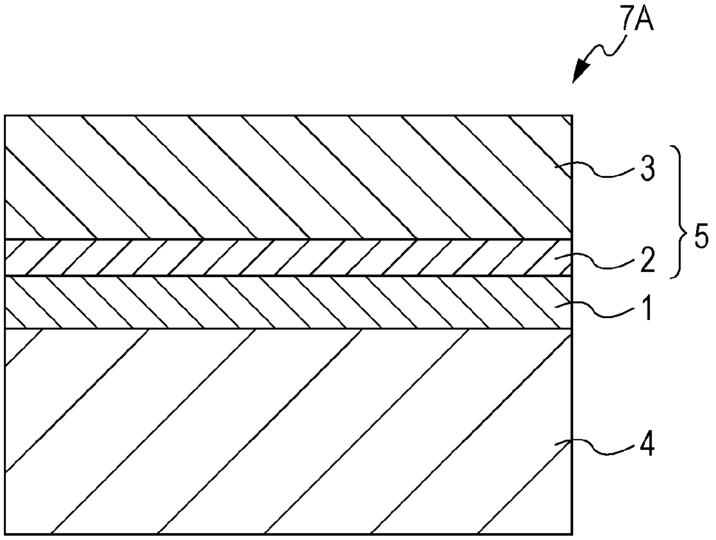
FIG. 1 is a schematic partial cross sectional view illustrating one example of a layer structure of an electrophotographic photoreceptor according to an exemplary embodiment.

The exemplary embodiments of the present disclosure will now be described. These disclosures and examples are used to describe, but not limit the scope of, the exemplary embodiments.

In this disclosure, a numerical range described by using "to" includes the number preceding "to" as the minimum value and the number following "to" as the maximum value.

In numerical ranges described stepwise in this disclosure, the upper limit or the lower limit of one numerical range may be substituted with an upper limit or a lower limit of a different numerical range also described stepwise. Furthermore, in any numerical range described in this disclosure, the upper limit or the lower limit of the numerical range may be substituted with a value indicated in Examples.

In this disclosure, the term "step" refers not only to an independent step but also to any feature that fulfills the intended purpose of that step although such a feature may not be clearly distinguishable from other steps.

In the present disclosure, each of the components may contain more than one corresponding substances. When an amount of any component in a composition is described in the present disclosure and when there are more than one substances that correspond to that component in the composition, the amount of the component is the total amount of the more than one corresponding substances present in the composition unless otherwise noted.

In this disclosure, a main component means a component used as a key component. For example, the main component is a component that accounts for 30 mass % or more of the total mass of a mixture of more than one components.

In the present disclosure, the electrophotographic photoreceptor may be simply referred to as a photoreceptor.

Electrophotographic Photoreceptor

A first exemplary embodiment of the electrophotographic photoreceptor includes a conductive support; and an undercoat layer and a photosensitive layer stacked on the conductive support, in which the undercoat layer contains crystalline electron transport compound particles, in X-ray diffraction measurement performed on the undercoat layer in a thickness direction, a maximum intensity peak has a half-width of 5° or less, and a maximum value Nmax among orientation indices N expressed by equation (1) below is 1 or more and 3 or less where $I_1$ represents a relative integral intensity of each of peaks in the X-ray diffraction measurement performed on the undercoat layer in the thickness direction, and $I_2$ represents a relative integral intensity of each of peaks in X-ray diffraction measurement performed on the undercoat layer processed into a powder form having a volume-average particle diameter of 5 □m or less:

$$\text{Orientation index} = \frac{\frac{I_1}{\sum I_1}}{\frac{I_2}{\sum I_2}} \tag{1}$$

A second exemplary embodiment of the electrophotographic photoreceptor includes a conductive support, and an undercoat layer and a photosensitive layer stacked on the conductive support, in which the undercoat layer contains crystalline electron transport compound particles, and the electron transport compound particles have an average aspect ratio of 4.5 or less.

In this description, the phrases "electrophotographic photoreceptor of the present disclosure" and "photoreceptor of the present disclosure" refer to those of the first and second exemplary embodiments unless otherwise noted.

FIG. 1 schematically illustrates one example of a layer structure of an electrophotographic photoreceptor according to this exemplary embodiment. A photoreceptor 7A illustrated in FIG. 1 has a structure in which an undercoat layer 1, a charge generation layer 2, and a charge transport layer 3 are stacked in this order on a conductive support 4. The charge generation layer 2 and the charge transport layer 3 constitute a photosensitive layer 5. The photoreceptor 7A may have a layer structure in which a protection layer is further provided on the charge transport layer 3.

The photosensitive layer of the electrophotographic photoreceptor of this exemplary embodiment may be a multilayer photosensitive layer in which the charge generation layer 2 and the charge transport layer 3 are separately provided as in the photoreceptor 7A illustrated in FIG. 1, or may be a single-layer photosensitive layer that has a charge generation ability and a charge transport ability instead of the charge generation layer 2 and the charge transport layer 3.

It has been shown that an undercoat layer containing dispersed crystalline electron transport compound particles exhibits a good electron transport property due to the π-π interaction between molecules of the crystals of the electron transport compound.

However, since the π-π interaction has a relatively strong bonding force compared to other intermolecular interactions, the bonding force has anisotropy, the crystal particles are likely to take a needle or flake shape, and the particles become oriented in the film due to the shape of the crystal particles. When particles become oriented, the sensitivity is adversely affected, the particles tend to come into contact with each other, and leakage points are easily formed.

In the electrophotographic photoreceptor of this exemplary embodiment, the maximum intensity peak has a half-width of 5° or less in X-ray diffraction measurement performed on the undercoat layer in the thickness direction, and the maximum value Nmax among orientation indices N expressed by equation (1) above is 1 or more and 3 or less where $I_1$ represents a relative integral intensity of each of peaks in the X-ray diffraction measurement performed on the undercoat layer in the thickness direction and $I_2$ represents a relative integral intensity of each of peaks in X-ray diffraction measurement performed on the undercoat layer processed into a powder form having a volume-average particle diameter of 5 μm or less, or the average aspect ratio of electron transport compound particles is 4.5 or less. Due to these features, there are fewer aggregates in the electron transport compound particles in the undercoat layer, and the electron transport compound particles are dispersed at random; thus, an electrophotographic photoreceptor having excellent chargeability and charge transport properties is obtained.

Hereinafter, the individual layers of the photoreceptor of this exemplary embodiment are described in detail.

Undercoat Layer

The electrophotographic photoreceptor of the present disclosure includes a conductive support, and an undercoat layer and a photosensitive layer stacked on the conductive support, and the undercoat layer contains crystalline electron transport compound particles.

The electron transport compound particles may have crystal diffraction peaks (or simply "peaks") in X-ray diffraction measurement, and may be single-crystal particles or aggregated particles composed of two or more crystal particles.

In this exemplary embodiment, the "maximum intensity peak" is a crystal diffraction peak that has the highest intensity, and the "half-width of the maximum intensity peak" refers to a width of the maximum intensity peak at an intermediate value between the peak top intensity and the background intensity in the 2θ direction.

In this exemplary embodiment, the relative integral intensity of a peak in X-ray diffraction measurement is obtained by integrating the value obtained by subtracting the background intensity from the peak intensity, and the subtraction of the background intensity is performed by a Shirley method.

The orientation index N expressed by formula (1) at a particular peak A is a value obtained by dividing a relative integral intensity of peak A/relative integral intensity of all peaks in X-ray diffraction measurement by a relative integral intensity of peak A/relative integral intensity of all peaks in X-ray diffraction measurement performed on the undercoat layer processed into a powdered form having a volume-average particle diameter of 5 μm or less.

Among orientation indices N expressed by formula (1) of the respective peaks, the largest value is the value of Nmax.

It is assumed that the powdered form of the undercoat layer having a volume-average particle diameter of 5 μm or less is in a random orientation state. Accordingly, the smaller the maximum value Nmax among the orientation indices N expressed by formula (1) above, the less oriented are the crystals in the undercoat layer and the more random the arrangements of crystal orientations of the electron transport compound particles in the undercoat layer.

In the first exemplary embodiment of the electrophotographic photoreceptor, the half-width of the maximum intensity peak in the X-ray diffraction measurement performed on the undercoat layer in the thickness direction is 5° or less, is preferably 3° or less from the viewpoints of the chargeability and the electron transport property, is more preferably 1.0° or less, and is particularly preferably 0.7° or less.

In the second exemplary embodiment of the electrophotographic photoreceptor, the half-width of the maximum intensity peak in the X-ray diffraction measurement performed on the undercoat layer in the thickness direction is 5° or less, more preferably 3° or less, yet more preferably 1.0° or less, and particularly preferably 0.7° or less from the viewpoints of the chargeability and the electron transport property.

In the first exemplary embodiment of the electrophotographic photoreceptor, the maximum value Nmax among orientation indices N expressed by equation (1) described above is 1 or more and 3 or less where $I_1$ represents a relative integral intensity of each of peaks in the X-ray diffraction measurement performed on the undercoat layer in the thickness direction, and $I_2$ represents a relative integral intensity of each of peaks in X-ray diffraction measurement performed on the undercoat layer processed into a powder form having a volume-average particle diameter of 5 μm or less. The maximum value Nmax is more preferably 1 or more and 2.7 or less and more preferably 1 or more and 2.5 or less from the viewpoints of the chargeability and the electron transport property.

In the second exemplary embodiment of the electrophotographic photoreceptor, the maximum value Nmax among orientation indices N expressed by equation (1) described above is 1 or more and 3 or less where $I_1$ represents a relative integral intensity of each of peaks in the X-ray diffraction measurement performed on the undercoat layer in the thickness direction, and $I_2$ represents a relative integral intensity of each of peaks in X-ray diffraction measurement performed on the undercoat layer processed into a powder form having a volume-average particle diameter of 5 μm or less. The maximum value Nmax is more preferably 1 or more and 2.7 or less and more preferably 1 or more and 2.5 or less from the viewpoints of the chargeability and the electron transport property.

In this exemplary embodiment, the half-width of the maximum intensity peak and the maximum value Nmax among the orientation indices N are determined by X-ray diffraction measurement. Specifically, the measurement is performed under the following measurement conditions.

Measurement instrument: D8 DISCOVER produced by Bruker AXS

X-ray source: Cukα

Measurement method: 2θ/θ scan

Alternatively, Cr, Fe, Co, or Mo may be used as the X-ray source, and the measurement range is set within the range with which all diffraction peaks of the electron transport compound in a powdered state can be detected.

Examples of the method for processing the undercoat layer into a powder form having a volume-average particle diameter of 5 μm or less include a pulverizing method that uses a ball mill, a bead mill, a mortar, a sand mill, a kneader, or an attritor, a method that involves dissolving the undercoat layer in fluoroacetic acid, sulfuric acid, or the like, and then bringing the resulting solution into contact with a poor solvent to precipitate fine crystals, and any method may be used. The pulverizing conditions may be a wet method or dry method. In pulverizing, an inorganic compound such as common salt or salt cake, and grinding media such as glass beads, steel beads, alumina beads, and zirconia beads may be used to obtain crystal uniformity. In the wet method, for the purpose of controlling the crystal form or size of the particles, all types of solvents including water, alcohol, organic solvents, etc., can be used.

Electron Transport Compound Particles

The undercoat layer contains crystalline electron transport compound particles.

In the second exemplary embodiment of the electrophotographic photoreceptor, the average aspect ratio of the electron transport compound particles is 4.5 or less, and from the viewpoints of the chargeability and electron transport property, the average aspect ratio is preferably 3.0 or less, more preferably 2.0 or less, and yet more preferably 1.0 or more and 1.5 or less.

In the second exemplary embodiment of the electrophotographic photoreceptor, the average aspect ratio of the electron transport compound particles is preferably 4.5 or less, more preferably 3.0 or less, yet more preferably 2.0 or less, and still more preferably 1.0 or more and 1.5 or less from the viewpoints of the chargeability and electron transport property.

The average aspect ratio of the electron transport compound particles in this exemplary embodiment is directly measured from the results of observing the particles with a field-emission scanning electron microscope (JSM-6700F produced by JEOL Ltd.) at a magnification of 3,000 to 100,000×. The long axis and the short axis are measured for 100 particles, the aspect ratio (long axis/short axis) is calculated, and the average of the aspect ratios of 100 particles is assumed to be the average aspect ratio.

From the viewpoint of chargeability and electron transport property, examples of the electron transport compound in the electron transport compound particles include perinone compounds; naphthalene diimide compounds; perylene diimide compounds; quinone compounds such as p-benzoquinone, chloranil, bromanyl, and anthraquinone; tetracyanoquinodimethane compounds; fluorenone compounds such as 2,4,7-trinitrofluorenone; dinaphthoquinone compounds; diphenoquinone compounds; xanthone compounds, benzophenone compounds; cyanovinyl compounds; and ethylene compounds. These electron transport materials may be used alone or in combination as a mixture, but preferably are used alone.

In particular, from the viewpoint of chargeability and electron transport property, the electron transport compound in the electron transport compound particles is preferably a naphthalene diimide compound or a perylene diimide compound, more preferably a naphthalenetetracarboxylic diimide compound or a perylenetetracarboxylic diimide compound, and yet more preferably a perylenetetracarboxylic diimide compound.

From the viewpoint of chargeability and electron transport property, the electron transport compound particles are preferably particles of a compound represented by any one of formulae (P1) to (P8) below, more preferably particles of a compound represented by any one of formulae (P1) to (P4) below, and yet more preferably particles of a compound represented by formula (P4) below. In this manner, the chargeability is improved, the dispersibility in the undercoat layer is improved, the composition is more evenly distributed, and thus the electron transport property is improved.

(P1)

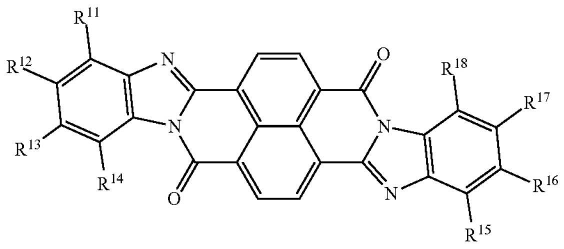

(P2)

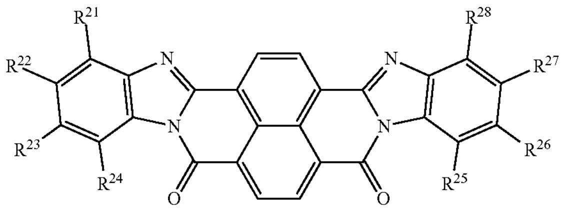

(P3)

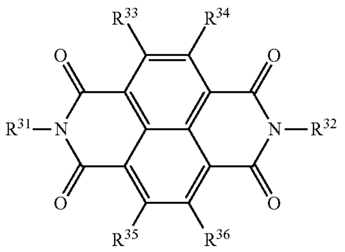

(P4)

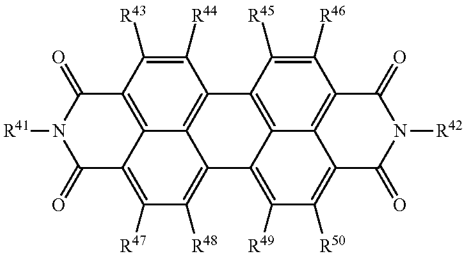

(P5)

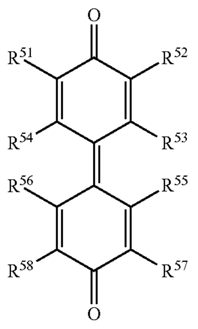

-continued (P6)

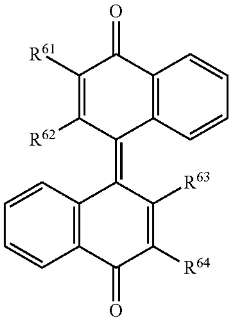

(P7)

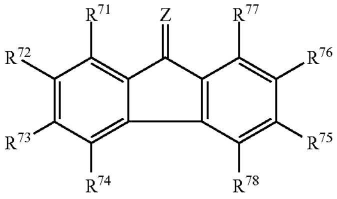

(P8)

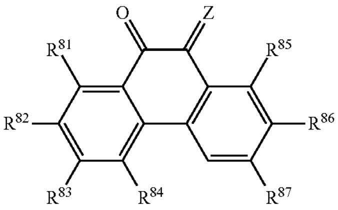

in formula (P1), $R^{11}$, $R^{12}$, $R^{13}$, $R^{14}$, $R^{15}$, $R^{16}$, $R^{17}$, and $R^{18}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{11}$ and $R^{12}$ taken together may form a ring and so may $R^{12}$ and $R^{13}$, and $R^{13}$ and $R^{14}$, and $R^{15}$ and $R^{16}$ taken together may form a ring and so may $R^{16}$ and $R^{17}$, and $R^{17}$ and $R^{18}$, in formula (P2), $R^{21}$, $R^{22}$, $R^{23}$, $R^{24}$, $R^{25}$, $R^{26}$, $R^{27}$, and $R^{28}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{21}$ and $R^{22}$ taken together may form a ring and so may $R^{22}$ and $R^{23}$, and $R^{23}$ and $R^{24}$, and $R^{25}$ and $R^{26}$ taken together may form a ring and so may $R^{26}$ and $R^{27}$, and $R^{27}$ and $R^{28}$, in formula (P3), $R^{31}$, $R^{32}$, $R^{33}$, $R^{34}$, $R^{35}$, and $R^{36}$ each independently represent a hydrogen atom, an alkyl group, an alkoxy group, an aralkyl group, an aryl group, an alkoxycarbonyl group, or a halogen atom, in formula (P4), $R^{41}$, $R^{42}$, $R^{43}$, $R^{44}$, $R^{45}$, $R^{46}$, $R^{47}$, $R^{48}$, $R^{49}$, and $R^{50}$ each independently represent a hydrogen atom, an alkyl group, an alkoxy group, an aralkyl group, an aryl group, an alkoxycarbonyl group, or a halogen atom, in formula (P5), $R^{51}$, $R^{52}$, $R^{53}$, $R^{54}$, $R^{55}$, $R^{56}$, $R^{57}$, and $R^{58}$ each independently represent a hydrogen atom, an alkyl group, an alkoxy group, an aralkyl group, an aryl group, an alkoxycarbonyl group, or a halogen atom, in formula (P6), $R^{61}$, $R^{62}$, $R^{63}$, and $R^{64}$ each independently represent a hydrogen atom, an alkyl group, an alkoxy group, an aralkyl group, an aryl group, an alkoxycarbonyl group, or a halogen atom, In formula (P7), $R^{71}$, $R^{72}$, $R^{73}$, $R^{74}$, $R^{75}$, $R^{76}$, $R^{77}$, and $R^{78}$ each independently represent a hydrogen atom, an alkyl group, an alkoxy group, an aralkyl group, an aryl group, an acyl group, an alkoxycarbonyl group, or a halogen atom, and Z represents an oxygen atom or a dicyanomethylene group ($=C(CN)_2$).

In formula (P8), $R^{81}$, $R^{82}$, $R^{83}$, $R^{84}$, $R^{85}$, $R^{86}$, and $R^{87}$ each independently represent a hydrogen atom, an alkyl group, an alkoxy group, an aralkyl group, an aryl group, an acyl group, an alkoxycarbonyl group, or a halogen atom, and Z represents an oxygen atom or a dicyanomethylene group ($=C(CN)_2$).

Compounds Represented by Formulae (P1) and (P2)

Compounds represented by formulae (P1) and (P2) will now be described.

(P1)

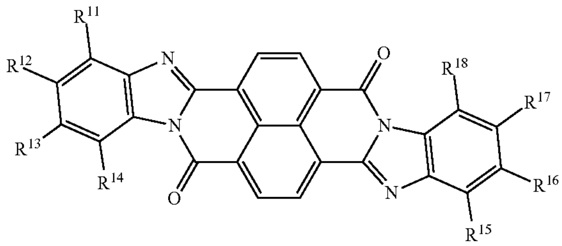

(P2)

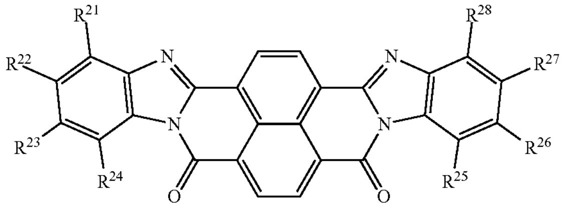

In formula (P1), $R^{11}$, $R^{12}$, $R^{13}$, $R^{14}$, $R^{15}$, $R^{16}$, $R^{17}$, and $R^{18}$ (hereinafter, may be simply referred to as "$R^{11}$ to $R^{18}$") each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom. $R^{11}$ and $R^{12}$ taken together may form a ring and so may $R^{12}$ and $R^{13}$, and $R^{13}$ and $R^{14}$. $R^{15}$ and $R^{16}$ taken together may form a ring and so may $R^{16}$ and $R^{17}$, and $R^{17}$ and $R^{18}$.

In formula (P2), $R^{21}$, $R^{22}$, $R^{23}$, $R^{24}$, $R^{25}$, $R^{26}$, $R^{27}$, and $R^{28}$ (hereinafter, may be simply referred to as "$R^{21}$ to $R^{28}$") each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom. $R^{21}$ and $R^{22}$ taken together may form a ring and so may $R^{22}$ and $R^{23}$, and $R^{23}$ and $R^{24}$. $R^{25}$ and $R^{26}$ taken together may form a ring and so may $R^{26}$ and $R^{27}$, and $R^{27}$ and $R^{28}$.

Examples of the alkyl group represented by $R^{11}$ to $R^{18}$ in formula (P1) include substituted or unsubstituted alkyl groups.

Examples of the unsubstituted alkyl group represented by $R^{11}$ to $R^{18}$ in formula (P1) include linear alkyl groups having 1 to 20 carbon atoms (preferably 1 to 10 carbon atoms and more preferably 1 to 6 carbon atoms), branched alkyl groups having 3 to 20 carbon atoms (preferably 3 to 10 carbon atoms), and cyclic alkyl groups having 3 to 20 carbon atoms (preferably 3 to 10 carbon atoms).

Examples of the linear alkyl groups having 1 to 20 carbon atoms include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, a tridecyl group, an n-tetradecyl group, an n-pentadecyl group, an n-heptadecyl group, an n-octadecyl group, an n-nonadecyl group, and an n-icosyl group.

Examples of the branched alkyl groups having 3 to 20 carbon atoms include an isopropyl group, an isobutyl group, a sec-butyl group, a tert-butyl group, an isopentyl group, a neopentyl group, a tert-pentyl group, an isohexyl group, a sec-hexyl group, a tert-hexyl group, an isoheptyl group, a sec-heptyl group, a tert-heptyl group, an isooctyl group, a sec-octyl group, a tert-octyl group, an isononyl group, a sec-nonyl group, a tert-nonyl group, an isodecyl group, a sec-decyl group, a tert-decyl group, an isododecyl group, a sec-dodecyl group, a tert-dodecyl group, a tert-tetradecyl group, and a tert-pentadecyl group.

Examples of the cyclic alkyl groups having 3 to 20 carbon atoms include a cyclopropyl group, a cyclobutyl group, a cyclopentyl group, a cyclohexyl group, a cycloheptyl group, a cyclooctyl group, a cyclononyl group, a cyclodecyl group, and polycyclic groups (for example, bicyclic, tricyclic, and spirocyclic groups) in which these monocyclic alkyl groups are bonded with each other.

Among those described above, linear alkyl groups, such as a methyl group and an ethyl group, are preferable as the unsubstituted alkyl group.

Examples of the substituent for the alkyl group include an alkoxy group, a hydroxy group, a carboxy group, a nitro group, and a halogen atom (a fluorine atom, a bromine atom, and an iodine atom).

Examples of the alkoxy group substituting the hydrogen atom in the alkyl group include the same groups as the unsubstituted alkoxy groups represented by $R^{11}$ to $R^{18}$ in formula (P1).

Examples of the alkoxy group represented by $R^{11}$ to $R^{18}$ in formula (P1) include substituted or unsubstituted alkoxy groups.

Examples of the unsubstituted alkoxy group represented by $R^{11}$ to $R^{18}$ in formula (P1) include linear, branched, and cyclic alkoxy groups having 1 to 10 carbon atoms (preferably 1 to 6 and more preferably 1 to 4 carbon atoms).

Specific examples of the linear alkoxy group include a methoxy group, an ethoxy group, an n-propoxy group, an n-butoxy group, an n-pentyloxy group, an n-hexyloxy group, an n-heptyloxy group, an n-octyloxy group, an n-nonyloxy group, and an n-decyloxy group.

Specific examples of the branched alkoxy group include an isopropoxy group, an isobutoxy group, a sec-butoxy group, a tert-butoxy group, an isopentyloxy group, a neopentyloxy group, a tert-pentyloxy group, an isohexyloxy group, a sec-hexyloxy group, a tert-hexyloxy group, an isoheptyloxy group, a sec-heptyloxy group, a tert-heptyloxy group, an isooctyloxy group, a sec-octyloxy group, a tert-octyloxy group, an isononyloxy group, a sec-nonyloxy group, a tert-nonyloxy group, an isodecyloxy group, a sec-decyloxy group, and a tert-decyloxy group.

Specific examples of the cyclic alkoxy group include a cyclopropoxy group, a cyclobutoxy group, a cyclopentyloxy group, a cyclohexyloxy group, a cycloheptyloxy group, a cyclooctyloxy group, a cyclononyloxy group, and a cyclodecyloxy group.

Among those described above, linear alkoxy groups are preferable as the unsubstituted alkoxy group.

Examples of the substituent for the alkoxy group include an aryl group, an alkoxycarbonyl group, an aryloxycarbonyl group, a hydroxyl group, a carboxy group, a nitro group, and a halogen atom (a fluorine atom, a bromine atom, and an iodine atom).

Examples of the aryl group substituting the hydrogen atom in the alkoxy group include the same groups as the unsubstituted aryl groups represented by $R^{11}$ to $R^{18}$ in formula (P1).

Examples of the alkoxycarbonyl group substituting the hydrogen atom in the alkoxy group include the same groups as the unsubstituted alkoxycarbonyl groups represented by $R^{11}$ to $R^{18}$ in formula (P1).

Examples of the aryloxycarbonyl group substituting the hydrogen atom in the alkoxy group include the same groups as the unsubstituted aryloxycarbonyl groups represented by $R^{11}$ to $R^{18}$ in formula (P1).

Examples of the aralkyl group represented by $R^{11}$ to $R^{18}$ in formula (P1) include substituted or unsubstituted aralkyl groups.

The unsubstituted aralkyl group represented by $R^{11}$ to $R^{18}$ in formula (P1) is preferably an aralkyl group having 7 to 30 carbon atoms, more preferably an aralkyl group having 7 to 16 carbon atoms, and yet more preferably an aralkyl group having 7 to 12 carbon atoms.

Examples of the unsubstituted aralkyl group having 7 to 30 carbon atoms include a benzyl group, a phenylethyl group, a phenylpropyl group, a 4-phenylbutyl group, a phenylpentyl group, a phenylhexyl group, a phenylheptyl group, a phenyloctyl group, a phenylnonyl group, a naphthylmethyl group, a naphthylethyl group, an anthratylmethyl group, and a phenyl-cyclopentylmethyl group.

Examples of the substituent for the aralkyl group include an alkoxy group, an alkoxycarbonyl group, an aryloxycarbonyl group, and a halogen atom (a fluorine atom, a bromine atom, and an iodine atom).

Examples of the alkoxy group substituting the hydrogen atom in the aralkyl group include the same groups as the unsubstituted alkoxy groups represented by $R^{11}$ to $R^{18}$ in formula (P1).

Examples of the alkoxycarbonyl group substituting the hydrogen atom in the aralkyl group include the same groups as the unsubstituted alkoxycarbonyl groups represented by $R^{11}$ to $R^{18}$ in formula (P1).

Examples of the aryloxycarbonyl group substituting the hydrogen atom in the aralkyl group include the same groups as the unsubstituted aryloxycarbonyl groups represented by $R^{11}$ to $R^{18}$ in formula (P1).

Examples of the aryl group represented by $R^{11}$ to $R^{18}$ in formula (P1) include substituted or unsubstituted aryl groups.

The unsubstituted aryl group represented by $R^{11}$ to $R^{18}$ in formula (P1) is preferably an aryl group having 6 to 30 carbon atoms, more preferably an aryl group having 6 to 14 carbon atoms, and yet more preferably an aryl group having 6 to 10 carbon atoms.

Examples of the aryl group having 6 to 30 carbon atoms include a phenyl group, a biphenyl group, a 1-naphthyl group, a 2-naphthyl group, a 9-anthryl group, a 9-phenanthryl group, a 1-pyrenyl group, a 5-naphthacenyl group, a 1-indenyl group, a 2-azulenyl group, a 9-fluorenyl group, a biphenylenyl group, an indacenyl group, a fluoranthenyl group, an acenaphthylenyl group, an aceanthrylenyl group, a phenalenyl group, a fluorenyl group, an anthryl group, a bianthracenyl group, a teranthracenyl group, a quarter anthracenyl group, an anthraquinolyl group, a phenanthryl group, a triphenanthryl group, a pyrenyl group, a chrysenyl group, a naphthacenyl group, a pleiadenyl group, a picenyl group, a perylenyl group, a pentaphenyl group, a pentacenyl group, a tetraphenylenyl group, a hexaphenyl group, a hexacenyl group, a rubicenyl group, and a coronenyl group. Among these, a phenyl group is preferable.

Examples of the substituent for the aryl group include an alkyl group, an alkoxy group, an alkoxycarbonyl group, an aryloxycarbonyl group, and a halogen atom (a fluorine atom, a bromine atom, and an iodine atom).

Examples of the alky group substituting the hydrogen atom in the aryl group include the same groups as the unsubstituted alkyl groups represented by $R^{11}$ to $R^{18}$ in formula (P1).

Examples of the alkoxy group substituting the hydrogen atom in the aryl group include the same groups as the unsubstituted alkoxy groups represented by $R^{11}$ to $R^{18}$ in formula (P1).

Examples of the alkoxycarbonyl group substituting the hydrogen atom in the aryl group include the same groups as the unsubstituted alkoxycarbonyl groups represented by $R^{11}$ to $R^{18}$ in formula (P1).

Examples of the aryloxycarbonyl group substituting the hydrogen atom in the aryl group include the same groups as the unsubstituted aryloxycarbonyl groups represented by $R^{11}$ to $R^{18}$ in formula (P1).

Examples of the aryloxy group (—O—Ar where Ar represents an aryl group) represented by $R^{11}$ to $R^{18}$ in formula (P1) include substituted or unsubstituted aryloxy groups.

The unsubstituted aryloxy group represented by $R^{11}$ to $R^{18}$ in formula (P1) is preferably an aryloxy group having 6 to 30 carbon atoms, more preferably an aryloxy group having 6 to 14 carbon atoms, and yet more preferably an aryloxy group having 6 to 10 carbon atoms.

Examples of the aryloxy group having 6 to 30 carbon atoms include a phenyloxy group (phenoxy group), a biphenyloxy group, a 1-naphthyloxy group, a 2-naphthyloxy group, a 9-anthryloxy group, a 9-phenanthryloxy group, a 1-pyrenyloxy group, a 5-naphthacenyloxy group, a 1-indenyloxy group, a 2-azulenyloxy group, a 9-fluorenyloxy group, a biphenylenyloxy group, an indacenyloxy group, a fluoranthenyloxy group, an acenaphthylenyloxy group, an aceanthryleneyloxy group, a phenalenyloxy group, a fluorenyloxy group, an anthryloxy group, a bianthracenyloxy group, a teranthracenyloxy group, a quarter anthracenyloxy group, a anthraquinolyloxy group, a phenanthryloxy group, a triphenylenyloxy group, a pyrenyloxy group, a chrycenyloxy group, a naphthacenyloxy group, a pleiadenyloxy group, a picenyloxy group, a peryleneyloxy group, a pentaphenyloxy group, a pentacenyloxy group, a tetraphenylenyloxy group, a hexaphenyloxy group, a hexacenyloxy group, a rubicenyloxy group, and a coronenyloxy group. Among these, a phenyloxy group (phenoxy group) is preferable.

Examples of the substituent for the aryloxy group include an alkyl group, an alkoxycarbonyl group, an aryloxycarbonyl group, and a halogen atom (a fluorine atom, a bromine atom, and an iodine atom).

Examples of the alky group substituting the hydrogen atom in the aryloxy group include the same groups as the unsubstituted alkyl groups represented by $R^{11}$ to $R^{18}$ in formula (P1).

Examples of the alkoxycarbonyl group substituting the hydrogen atom in the aryloxy group include the same groups as the unsubstituted alkoxycarbonyl groups represented by $R^{11}$ to $R^{18}$ in formula (P1).

Examples of the aryloxycarbonyl group substituting the hydrogen atom in the aryloxy group include the same groups as the unsubstituted aryloxycarbonyl groups represented by $R^{11}$ to $R^{18}$ in formula (P1).

Examples of the alkoxycarbonyl group (—CO—OR where R represents an alkyl group) represented by $R^{11}$ to $R^{18}$ in formula (P1) include substituted or unsubstituted alkoxycarbonyl groups.

The number of carbon atoms in the alkyl chain in the unsubstituted alkoxycarbonyl group represented by $R^{11}$ to $R^{18}$ in formula (P1) is preferably 1 to 20, more preferably 1 to 15, and yet more preferably 1 to 10.

Examples of the alkoxycarbonyl group having 1 to 20 carbon atoms in the alkyl chain include a methoxycarbonyl group, an ethoxycarbonyl group, a propoxycarbonyl group, an isopropoxycarbonyl group, an n-butoxycarbonyl group, a sec-butoxybutylcarbonyl group, a tert-butoxycarbonyl group, a pentaoxycarbonyl group, a hexaoxycarbonyl group, a heptaoxycarbonyl group, an octaoxycarbonyl group, a nonaoxycarbonyl group, a decaoxycarbonyl group, a dodecaoxycarbonyl group, a tridecaoxycarbonyl group, a tetradecaoxycarbonyl group, a pentadecaoxycarbonyl group, a hexadecaoxycarbonyl group, a heptadecaoxycarbonyl group, an octadecaoxycarbonyl group, a nonadecaoxycarbonyl group, and an icosaoxycarbonyl group.

Examples of the substituent for the alkoxycarbonyl group include an aryl group, a hydroxy group, and a halogen atom (a fluorine atom, a bromine atom, and an iodine atom).

Examples of the aryl group substituting the hydrogen atom in the alkoxycarbonyl group include the same groups as the unsubstituted aryl groups represented by $R^{11}$ to $R^{18}$ in formula (P1).

Examples of the aryloxycarbonyl group (—CO—OAr where Ar represents an aryl group) represented by $R^{11}$ to $R^{18}$ in formula (P1) include substituted or unsubstituted aryloxycarbonyl groups.

The number of carbon atoms in the aryl group in the unsubstituted aryloxycarbonyl group represented by $R^{11}$ to $R^{18}$ in formula (P1) is preferably 6 to 30, more preferably 6 to 14, and yet more preferably 6 to 10.

Examples of the aryloxycarbonyl group having an aryl group having 6 to 30 carbon atoms include a phenoxycarbonyl group, a biphenyloxycarbonyl group, a 1-naphthyloxycarbonyl group, a 2-naphthyloxycarbonyl group, a 9-anthryloxycarbonyl group, a 9-phenanthryloxycarbonyl group, a 1-pyrenyloxycarbonyl group, a 5-naphthacenyloxycarbonyl group, a 1-indenyloxycarbonyl group, a 2-azulenyloxycarbonyl group, a 9-fluorenyloxycarbonyl group, a biphenylenyloxycarbonyl group, an indacenyloxycarbonyl group, a fluoranthenyloxycarbonyl group, an acenaphthylenyloxycarbonyl group, an aceanthryleneyloxycarbonyl group, a phenalenyloxycarbonyl group, a fluorenyloxycarbonyl group, an anthryloxycarbonyl group, a bianthracenyloxycarbonyl group, a teranthracenyloxycarbonyl group, a quarter anthracenyloxycarbonyl group, a anthraquinolyloxycarbonyl group, a phenanthryloxycarbonyl group, a triphenylenyloxycarbonyl group, a pyrenyloxycarbonyl group, a chrycenyloxycarbonyl group, a naphthacenyloxycarbonyl group, a pleiadenyloxycarbonyl group, a picenyloxycarbonyl group, a peryleneyloxycarbonyl group, a pentaphenyloxycarbonyl group, a pentacenyloxycarbonyl group, a tetraphenylenyloxycarbonyl group, a hexaphenyloxycarbonyl group, a hexacenyloxycarbonyl group, a rubicenyloxycarbonyl group, and a coronenyloxycarbonyl group. Among these, a phenoxycarbonyl group is preferable.

Examples of the substituent for the aryloxycarbonyl group include an alkyl group, a hydroxy group, and a halogen atom (a fluorine atom, a bromine atom, and an iodine atom).

Examples of the alky group substituting the hydrogen atom in the aryloxycarbonyl group include the same groups as the unsubstituted alkyl groups represented by $R^{11}$ to $R^{18}$ in formula (P1).

Examples of the alkoxycarbonylalkyl group ($-(C_nH_{2n})-CO-OR$ where R represents an alkyl group, and n represents an integer of 1 or more) represented by $R^{11}$ to $R^{18}$ in formula (P1) include substituted or unsubstituted alkoxycarbonylalkyl groups.

Examples of the alkoxycarbonyl group ($-CO-OR$) in the unsubstituted alkoxycarbonylalkyl group represented by $R^{11}$ to $R^{18}$ in formula (P1) include the same groups as the alkoxycarbonylalkyl groups represented by $R^{11}$ to $R^{18}$ in formula (P1).

Examples of the alkylene chain ($-C_nH_{2n}-$) in the unsubstituted alkoxycarbonylalkyl group by $R^{11}$ to $R^{18}$ in formula (P1) include linear alkylene chains having 1 to 20 carbon atoms (preferably 1 to 10 carbon atoms and more preferably 1 to 6 carbon atoms), branched alkylene chains having 3 to 20 carbon atoms (preferably 3 to 10 carbon atoms), and cyclic alkylene chains having 3 to 20 carbon atoms (preferably 3 to 10 carbon atoms).

Examples of the linear alkylene chains having 1 to 20 carbon atoms include a methylene group, an ethylene group, an n-propylene group, an n-butylene group, an n-pentylene group, an n-hexylene group, an n-heptylene group, an n-octylene group, an n-nonylene group, an n-decylene group, an n-undecylene group, an n-dodecylene group, a tridecylene group, an n-tetradecylene group, an n-pentadecylene group, an n-heptadecylene group, an n-octadecylene group, an n-nonadecyl group, and an n-icosylene group.

Examples of the branched alkylene chains having 3 to 20 carbon atoms include an isopropylene group, an isobutylene group, a sec-butylene group, a tert-butylene group, an isopentylene group, a neopentylene group, a tert-pentylene group, an isohexylene group, a sec-hexylene group, a tert-hexylene group, an isoheptylene group, a sec-heptylene group, a tert-heptylene group, an isooctylene group, a sec-octylene group, a tert-octylene group, an isononylene group, a sec-nonylene group, a tert-nonylene group, an isodecylene group, a sec-decylene group, a tert-decylene group, an isododecylene group, a sec-dodecylene group, a tert-dodecylene group, a tert-tetradecylene group, and a tert-pentadecylene group.

Examples of the cyclic alkylene chains having 3 to 20 carbon atoms include a cyclopropylene group, a cyclobutylene group, a cyclopentylene group, a cyclohexylene group, a cycloheptylene group, a cyclooctylene group, a cyclononylene group, and a cyclodecylene group.

Examples of the substituent for the alkoxycarbonylalkyl group include an aryl group, a hydroxy group, and a halogen atom (a fluorine atom, a bromine atom, and an iodine atom).

Examples of the aryl group substituting the hydrogen atom in the alkoxycarbonylalkyl group include the same groups as the unsubstituted aryl groups represented by $R^{11}$ to $R^{18}$ in formula (P1).

Examples of the aryloxycarbonylalkyl group ($-(C_nH_{2n})-CO-OAr$ where Ar represents an aryl group, and n represents an integer of 1 or more) represented by $R^{11}$ to $R^{18}$ in formula (P1) include substituted or unsubstituted aryloxycarbonylalkyl groups.

Examples of the aryloxycarbonyl group ($-CO-OAr$ where Ar represents an aryl group) in the unsubstituted aryloxycarbonylalkyl group represented by $R^{11}$ to $R^{18}$ in formula (P1) include the same groups as the aryloxycarbonyl groups represented by $R^{11}$ to $R^{18}$ in formula (P1).

Examples of the alkylene chain ($-C_nH_{2n}-$) in the unsubstituted aryloxycarbonylalkyl group represented by $R^{11}$ to $R^{18}$ in formula (P1) include the same groups as the alkylene chains in the alkoxycarbonylalkyl groups represented by $R^{11}$ to $R^{18}$ in formula (P1).

Examples of the substituent for the aryloxycarbonylalkyl group include an alkyl group, a hydroxy group, and a halogen atom (a fluorine atom, a bromine atom, and an iodine atom).

Examples of the alky group substituting the hydrogen atom in the aryloxycarbonylalkyl group include the same groups as the unsubstituted alkyl groups represented by $R^{11}$ to $R^{18}$ in formula (P1).

Examples of the halogen atom represented by $R^{11}$ to $R^{18}$ in formula (P1) include a fluorine atom, a chlorine atom, a bromine atom, and an iodine atom.

In formula (P1), the cyclic structure formed by two or more selected from $R^{11}$ to $R^{14}$ and the cyclic structure formed by two or more selected from $R^{15}$ to $R^{18}$ may each be an aliphatic hydrocarbon cyclic structure, a heterocyclic structure, an aromatic hydrocarbon cyclic structure, or a heterocyclic aromatic structure, but are preferably each an aromatic hydrocarbon cyclic structure. Examples of the cyclic structure include a benzene ring, a fused ring having 10 to 18 carbon atoms (a naphthalene ring, an anthracene ring, a phenanthrene ring, a chrysene ring (a benzo[α]phenanthrene ring), a tetracene ring, a tetraphene ring (a benzo[α]anthracene ring), and a triphenylene ring), and a benzene ring is particularly preferable.

Examples of the alkyl group represented by $R^{21}$ to $R^{28}$ in formula (P2) include the same groups as the alkyl groups represented by $R^{11}$ to $R^{18}$ in formula (P1).

Examples of the alkoxy group represented by $R^{21}$ to $R^{28}$ in formula (P2) include the same groups as the alkoxy groups represented by $R^{11}$ to $R^{18}$ in formula (P1).

Examples of the aralkyl group represented by $R^{21}$ to $R^{28}$ in formula (P2) include the same groups as the aralkyl groups represented by $R^{11}$ to $R^{18}$ in formula (P1).

Examples of the aryl group represented by $R^{21}$ to $R^{28}$ in formula (P2) include the same groups as the aryl groups represented by $R^{11}$ to $R^{18}$ in formula (P1).

Examples of the aryloxy group represented by $R^{21}$ to $R^{28}$ in formula (P2) include the same groups as the aryloxy groups represented by $R^{11}$ to $R^{18}$ in formula (P1).

Examples of the alkoxycarbonyl group represented by $R^{21}$ to $R^{28}$ in formula (P2) include the same groups as the alkoxycarbonyl groups represented by $R^{11}$ to $R^{18}$ in formula (P1).

Examples of the aryloxycarbonyl group represented by $R^{21}$ to $R^{28}$ in formula (P2) include the same groups as the aryloxycarbonyl groups represented by $R^{11}$ to $R^{18}$ in formula (P1).

Examples of the alkoxycarbonylalkyl group represented by $R^{21}$ to $R^{28}$ in formula (P2) include the same groups as the alkoxycarbonylalkyl groups represented by $R^{11}$ to $R^{18}$ in formula (P1).

Examples of the aryloxycarbonylalkyl group represented by $R^{21}$ to $R^{28}$ in formula (P2) include the same groups as the aryloxycarbonylalkyl groups represented by $R^{11}$ to $R^{18}$ in formula (P1).

Examples of the halogen atom represented by $R^{21}$ to $R^{28}$ in formula (P2) include the same atoms as the halogen atoms represented by $R^{11}$ to $R^{18}$ in formula (P1).

Examples of the cyclic structure formed by $R^{21}$ and $R^{22}$, $R^{22}$ and $R^{23}$, $R^{23}$ and $R^{24}$, $R^{25}$ and $R^{26}$, $R^{26}$ and $R^{27}$, or $R^{27}$ and $R^{28}$ in formula (P2) include a benzene ring, a fused ring having 10 to 18 carbon atoms (a naphthalene ring, an anthracene ring, a phenanthrene ring, a chrysene ring (a benzo[α]phenanthrene ring), a tetracene ring, a tetraphene ring (benzo[α]anthracene ring), and a triphenylene ring). Among these, a benzene ring is preferable as the cyclic structure to be formed.

In formula (P1), $R^{11}$, $R^{12}$, $R^{13}$, $R^{14}$, $R^{15}$, $R^{16}$, $R^{17}$, and $R^{18}$ may each independently represent a hydrogen atom, an alkyl group, an alkoxycarbonyl group, an aryloxycarbonyl group, an alkoxycarbonylalkyl group, or an aryloxycarbonylalkyl group.

In formula (P2), $R^{21}$, $R^{22}$, $R^{23}$, $R^{24}$, $R^{25}$, $R^{26}$, $R^{27}$, and $R^{28}$ may each independently represent a hydrogen atom, an alkyl group, an alkoxycarbonyl group, an aryloxycarbonyl group, an alkoxycarbonylalkyl group, or an aryloxycarbonylalkyl group.

In the description below, specific examples of the compounds represented by formulae (P1) and (P2) are described, and these examples are not limiting. In the description below, Ph represents a phenyl group.

1-1

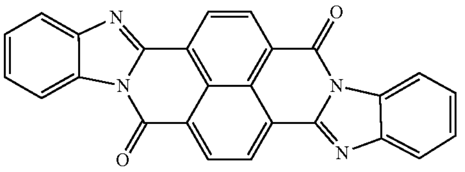

1-2

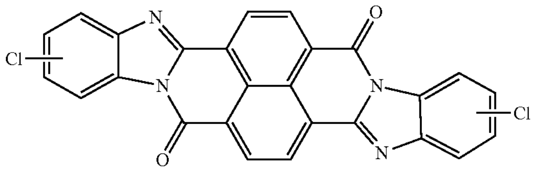

1-3

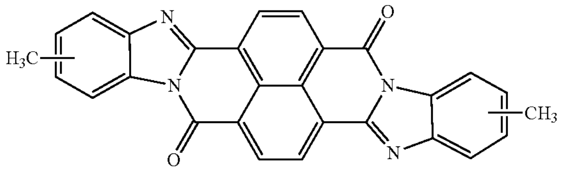

1-4

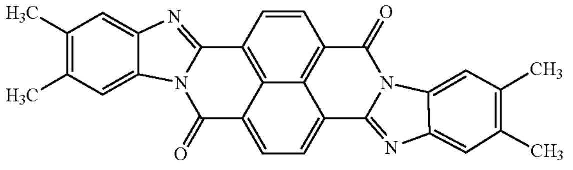

1-5

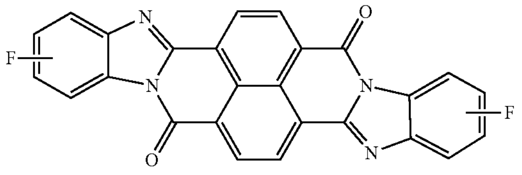

1-6

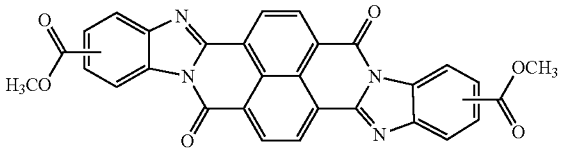

1-7

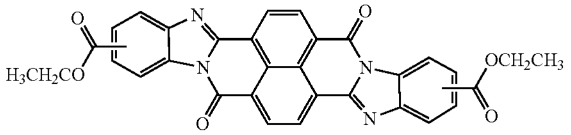

1-8

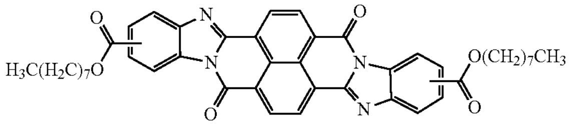

1-9

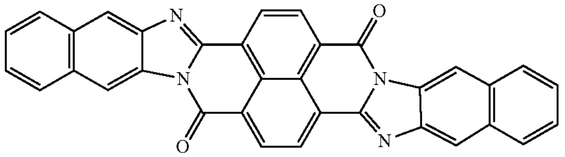

1-10

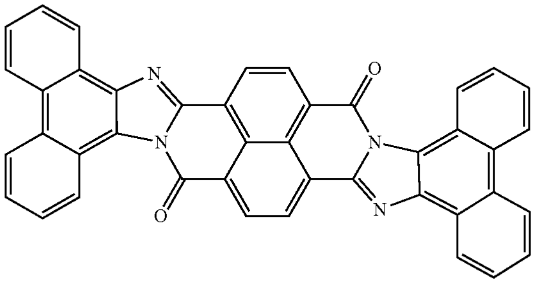

1-11

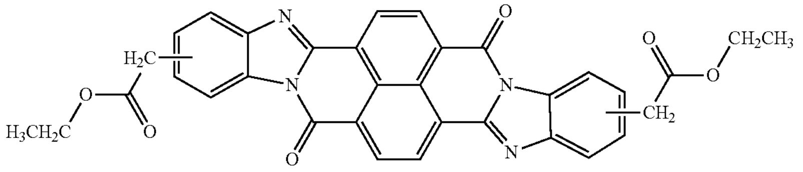

-continued
1-12
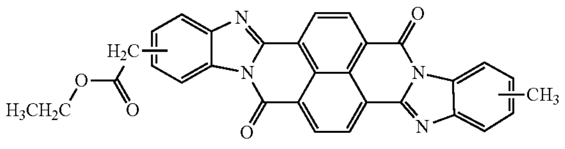
1-13
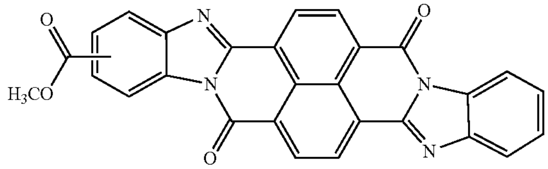
1-14
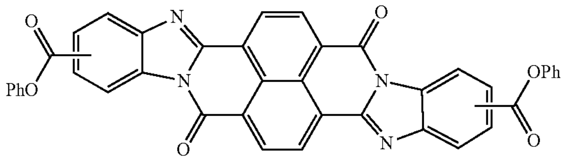
1-15
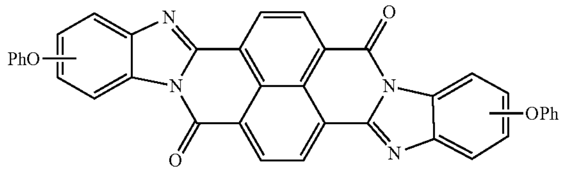
1-16
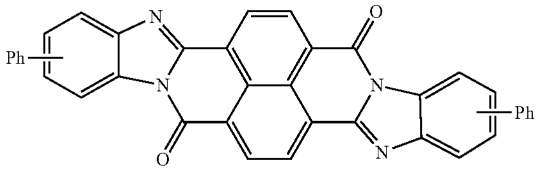
1-17
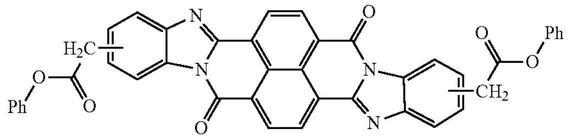
1-18
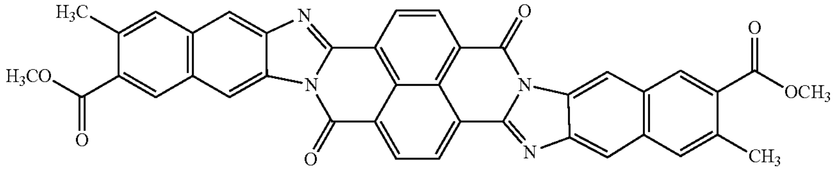
2-1
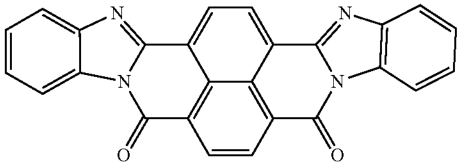
2-2
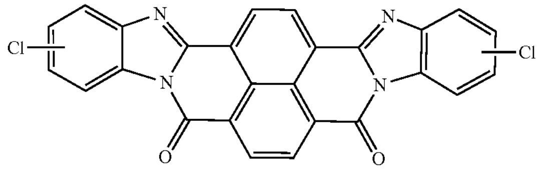
2-3
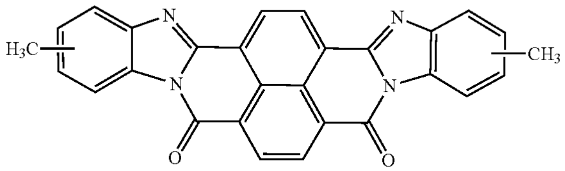
2-4
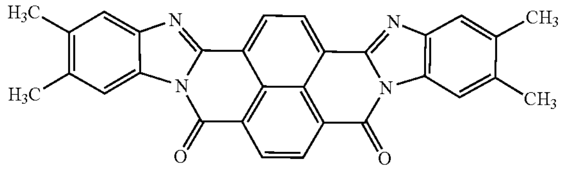
2-5
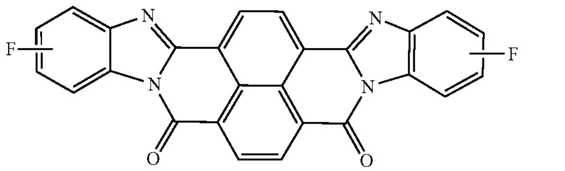
2-6
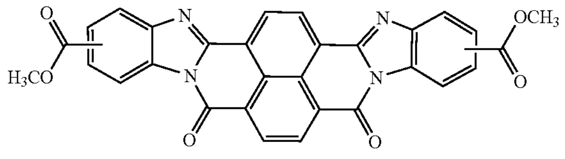
2-7
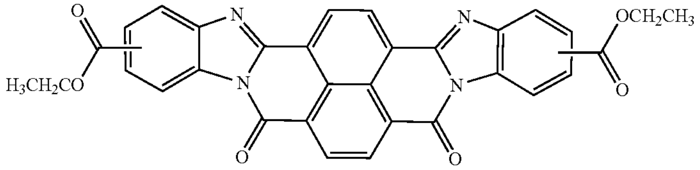

-continued 2-8

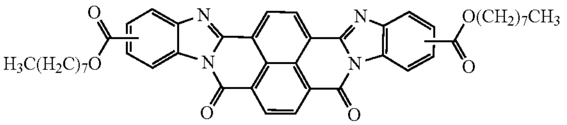

2-9

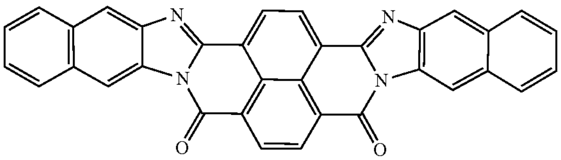

2-10

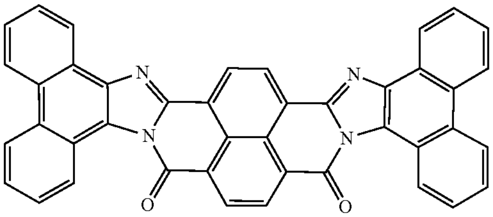

2-11

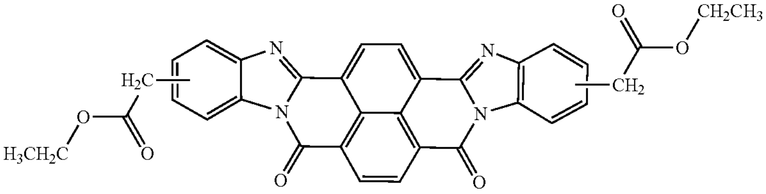

2-13

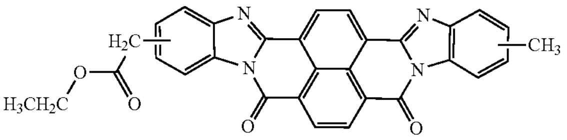

2-12

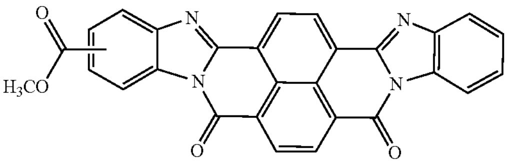

2-14

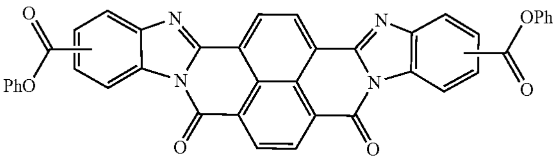

2-15

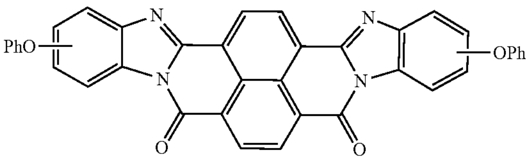

2-17

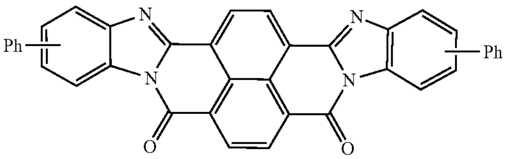

2-16

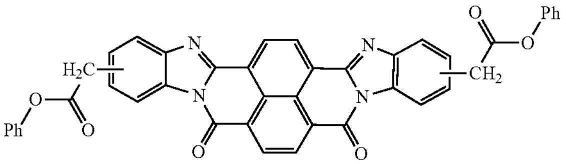

2-18

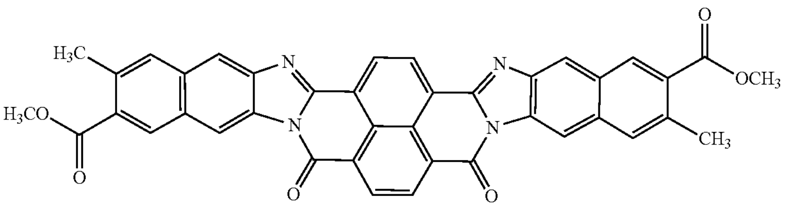

A compound represented by formula (P1) and a compound represented by formula (P2) are isomeric to each other (in other words, a cis isomer and a trans isomer). A typical synthetic scheme involves heating and fusing 2 mol of an orthophenylenediamine compound and 1 mol of a naphthalenetetracarboxylic acid compound, which gives a mixture of cis and trans isomers, and the mix ratio is usually larger for the cis isomer than the trans isomer. Separating the cis isomer and the trans isomer can involve, for example, heating and washing with an alcohol solution of potassium hydroxide so that the cis isomer soluble in the solution can be separated from the trans isomer that is insoluble in the solution.

Compounds Represented by Formula (P3)

Compounds represented by formula (P3) will now be described.

(P3)

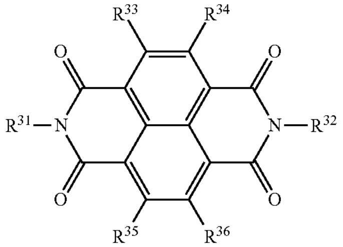

In formula (P3), $R^{31}$, $R^{32}$, $R^{33}$, $R^{34}$, $R^{35}$, and $R^{36}$ (hereinafter may be simply referred to as $R^{31}$ to $R^{36}$) each independently represent a hydrogen atom, an alkyl group, an alkoxy group, an aralkyl group, an aryl group, an alkoxycarbonyl group, or a halogen atom.

Examples of the alkyl group, the alkoxy group, the aralkyl group, the aryl group, the alkoxycarbonyl group, and the halogen atom represented by $R^{31}$ to $R^{36}$ in formula (P3) include the same groups and atoms as the alkyl groups, the alkoxy groups, the aralkyl groups, the aryl groups, the alkoxycarbonyl groups, and the halogen atoms represented by $R^{11}$ to $R^{18}$ in formula (P1).

In the description below, example compounds of the compounds represented by formula (P3) are described, and these examples are not limiting. Note that an example compound number below is hereinafter indicated as an example compound (3-number), for example. Specifically, for example, an example compound 5 described below is referred to as an "example compound (3-5)". The same applies to other formulae.

| Example compound | $R^{31}$ | $R^{32}$ | $R^{33}$ | $R^{34}$ | $R^{35}$ | $R^{36}$ |
|---|---|---|---|---|---|---|
| 1 | H | H | H | H | H | H |
| 2 | $—CH_3$ | $—CH_3$ | H | H | H | H |
| 3 | —Pr | —Pr | H | H | H | H |
| 4 | $—CH_2COOCH_3$ | $—CH_2COOCH_3$ | H | H | H | H |
| 5 | $-c-C_6H_{11}$ | $-c-C_6H_{11}$ | H | H | H | H |
| 6 | $-c-C_6H_{11}$ | $-c-C_6H_{11}$ | —Br | H | H | —Br |
| 7 | $—C_6H_5$ | $—C_6H_5$ | H | H | H | H |
| 8 | $-p-Cl—C_6H_4$ | $-p-Cl—C_6H_4$ | H | H | H | H |
| 9 | $—CH_2C_6H_5$ | $—CH_2C_6H_5$ | H | H | H | H |
| 10 | $—CH_2CH_2C_6H_5$ | $—CH_2CH_2C_6H_5$ | H | H | H | H |

Abbreviations in the aforementioned example compounds are as follows.

Pr: n-propyl group $c-C_6H_{11}$: cyclohexyl group $C_6H_5$: phenyl group:

$p-Cl—C_6H_4$: parachlorophenyl group $C_6H_5CH_2$: benzyl group $C_6H_5CH_2CH_2$: phenethyl group Compounds Represented by Formula (P4)

Compounds represented by formula (P4) will now be described.

(P4)

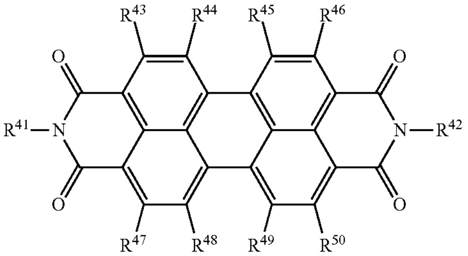

In formula (P4), $R^{41}$, $R^{42}$, $R^{43}$, $R^{44}$, $R^{45}$, $R^{46}$, $R^{47}$, $R^{48}$, $R^{49}$, and $R^{50}$ (hereinafter may be simply referred to as "$R^{41}$ to $R^{50}$") each independently represent a hydrogen atom, an alkyl group, an alkoxy group, an aralkyl group, an aryl group, an alkoxycarbonyl group, or a halogen atom.

Examples of the alkyl group, the alkoxy group, the aralkyl group, the aryl group, the alkoxycarbonyl group, and the halogen atom represented by $R^{41}$ to $R^{46}$ in formula (P4) include the same groups and atoms as the alkyl groups, the alkoxy groups, the aralkyl groups, the aryl groups, the alkoxycarbonyl groups, and the halogen atoms represented by $R^{11}$ to $R^{18}$ in formula (P1).

In the description below, example compounds of the compounds represented by formula (P4) are described, and these examples are not limiting. Note that an example compound number below is hereinafter indicated as an example compound (3-number). Specifically, for example, an example compound 5 is referred to as an "example compound (3-5).

| Example compound | $R^{41}$ | $R^{42}$ | $R^{43}$ | $R^{44}$ | $R^{45}$ | $R^{46}$ | $R^{47}$ | $R^{48}$ | $R^{49}$ | $R^{50}$ |
|---|---|---|---|---|---|---|---|---|---|---|
| 1 | H | H | H | H | H | H | H | H | H | H |
| 2 | $—CH_3$ | $—CH_3$ | H | H | H | H | H | H | H | H |
| 3 | $—CH_3$ | $—CH_3$ | H | —Cl | —Cl | H | H | —Cl | —Cl | H |
| 4 | -Bu | -Bu | H | H | H | H | H | H | H | H |
| 5 | $-c-C_6H_{11}$ | $-c-C_6H_{11}$ | H | H | H | H | H | H | H | H |

-continued

| Example compound | $R^{41}$ | $R^{42}$ | $R^{43}$ | $R^{44}$ | $R^{45}$ | $R^{46}$ | $R^{47}$ | $R^{48}$ | $R^{49}$ | $R^{50}$ |
|---|---|---|---|---|---|---|---|---|---|---|
| 6 | $-p-CH_3—C_3H_4$ | $-p-CH_3—C_6H_5$ | H | H | H | H | H | H | H | H |
| 7 | $—C_6H_5$ | $—C_6H_5$ | H | H | H | H | H | H | H | H |
| 8 | $-p-Cl—C_6H_4$ | $-p-Cl—C_6H_4$ | H | H | H | H | H | H | H | H |
| 9 | $-o-Cl—C_6H_4$ | $-o-Cl—C_8H_4$ | H | H | H | H | H | H | H | H |
| 10 | $—CH_2C_6H_5$ | $—CH_2C_6H_5$ | H | H | H | H | H | H | H | H |
| 11 | $-3,5-(CH_3)_2—C_6H_5$ | $-3,5-(CH_3)_2—C_6H_3$ | H | H | H | H | H | H | H | H |
| 12 | $-3,5-Cl_2—C_6H_3$ | $-3,5-Cl_2—C_6H_3$ | H | H | H | H | H | H | H | H |

Abbreviations in the aforementioned example compounds are as follows.

Bu: n-butyl group $c-C_6H_{11}$: cyclohexyl group:

$p-CH_3-C_6H_4$: paratolyl group $C_6H_5$: phenyl group:

$p-Cl—C_6H_4$: parachlorophenyl group $o-Cl—C_6H_4$: orthochlorophenyl group $C_6H_5CH_2$: benzyl group $3,5-(CH_3)_2-C_6H_4$: 3,5-dimethylphenyl group $3,5-Cl_2-C_6H_4$: 3,5-dichlorophenyl group Compounds Represented by Formula (P5)

Compounds represented by formula (P5) will now be described.

(P5)

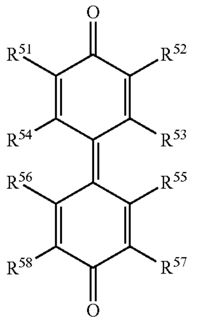

In formula (P5), $R^{51}$, $R^{52}$, $R^{53}$, $R^{54}$, $R^{55}$, $R^{56}$, $R^{57}$, and $R^{58}$ (hereinafter may be simply referred to as "$R^{51}$ to $R^{58}$") each independently represent a hydrogen atom, an alkyl group, an alkoxy group, an aralkyl group, an aryl group, an alkoxycarbonyl group, or a halogen atom.

Examples of the alkyl group, the alkoxy group, the aralkyl group, the aryl group, the alkoxycarbonyl group, and the halogen atom represented by $R^{51}$ to $R^{58}$ in formula (P5) include the same groups and atoms as the alkyl groups, the alkoxy groups, the aralkyl groups, the aryl groups, the alkoxycarbonyl groups, and the halogen atoms represented by $R^{11}$ to $R^{18}$ in formula (P1).

In formula (P5), $R^{51}$ to $R^{58}$ may each independently represent a hydrogen atom, an alkyl group having 1 to 12 carbon atoms, an alkoxy group having 1 to 12 carbon atoms, a cycloalkyl group, an aryl group, or an aralkyl group.

From the viewpoint of the electron transport property, $R^{51}$ and $R^{58}$ in formula (P5) preferably each independently represent an alkyl group having 3 to 12 carbon atoms, an alkoxy group having 3 to 12 carbon atoms, a cycloalkyl group, an aryl group, or an aralkyl group, more preferably each independently represent a branched alkyl group having 3 to 12 carbon atoms, a branched alkoxy group having 3 to 12 carbon atoms, a cycloalkyl group, an aryl group, or an aralkyl group, yet more preferably each independently represent a branched alkyl having 3 to 8 carbon atoms or a branched alkoxy group having 3 to 8 carbon atoms, and particularly preferably each independently represent a t-butyl group.

From the viewpoint of the electron transport property, $R^{52}$ and $R^{57}$ in formula (P5) preferably each independently represent a hydrogen atom, an alkyl group having 1 to 8 carbon atoms, or an alkoxy group having 1 to 8 carbon atoms, more preferably each independently represent a hydrogen atom, a linear alkyl group having 1 to 4 carbon atoms, or a linear alkoxy group having 1 to 4 carbon atoms, yet more preferably each independently represent a linear alkyl group having 1 to 3 carbon atoms or a linear alkoxy group having 1 to 3 carbon atoms, and particularly preferably each independently represent a methyl group.

In formula (P5), $R^{53}$, $R^{54}$, $R^{55}$, and $R^{56}$ may represent a hydrogen atom.

In formula (P5), from the viewpoint of the electron transport property, $R^{51}$ and $R^{58}$ may be the same group.

In formula (P5), from the viewpoint of the electron transport property, $R^{52}$ and $R^{57}$ may be the same group.

In formula (P5), from the viewpoint of the electron transport property, $R^{51}$ and $R^{52}$ may be different groups.

In formula (P5), from the viewpoint of the electron transport property, $R^{57}$ and $R^{58}$ may be different groups.

In the description below, example compounds of the compounds represented by formula (P5) are described, and these examples are not limiting.

| Example compound | $R^{51}$ | $R^{52}$ | $R^{53}$ | $R^{54}$ | $R^{55}$ | $R^{56}$ | $R^{57}$ | $R^{58}$ |
|---|---|---|---|---|---|---|---|---|
| 1 | $t-C_4H_9$ | $—CH_3$ | H | H | H | H | $—CH_3$ | $t-C_4H_9$ |
| 2 | $t-C_4H_9$ | H | H | H | H | H | H | $t-C_4H_9$ |
| 3 | $t-C_4H_9$ | $—OCH_3$ | H | H | H | H | $—OCH_3$ | $t-C_4H_9$ |
| 4 | $t-C_4H_9O$ | $—CH_3$ | H | H | H | H | $—CH_3$ | $-f-C_4H_9O$ |
| 5 | $-c-C_6H_{11}$ | $—CH_3$ | H | H | H | H | $—CH_3$ | $-c-C_6H_{11}$ |
| 6 | $C_6H_5$ | $—CH_3$ | H | H | H | H | $—CH_3$ | $—C_6H_5$ |
| 7 | $—CH_2C_6H_5$ | $—CH_3$ | H | H | H | H | $—CH_3$ | $—CH_2C_6H_5$ |
| 8 | $t-C_4H_9$ | $t-C_4H_9$ | H | H | H | H | $t-C_4H_9$ | $-t-C_4H_9$ |

Abbreviations in the aforementioned example compounds are as follows.

$t\text{-}C_4H_9$: t-butyl group $CH_3O$: methoxy group $t\text{-}C_4H_9O$: t-butoxy group $c\text{-}C_6H_{11}$: cyclohexyl group $C_6H_5$: phenyl group $C_6H_5CH_2$: benzyl group Compounds Represented by Formula (P6)

Compounds represented by formula (P6) will now be described.

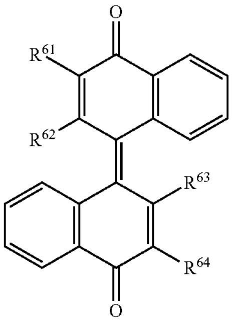

(P6)

In formula (P6), $R^{61}$, $R^{62}$, $R^{63}$, and $R^{64}$ (hereinafter may be simply referred to as $R^{61}$ to $R^{64}$) each independently represent a hydrogen atom, an alkyl group, an alkoxy group, an aralkyl group, an aryl group, an alkoxycarbonyl group, or a halogen atom.

Examples of the alkyl group, the alkoxy group, the aralkyl group, the aryl group, the alkoxycarbonyl group, and the halogen atom represented by $R^{61}$ to $R^{64}$ in formula (P6) include the same groups and atoms as the alkyl groups, the alkoxy groups, the aralkyl groups, the aryl groups, the alkoxycarbonyl groups, and the halogen atoms represented by $R^{11}$ to $R^{18}$ in formula (P1).

In formula (P6), $R^{61}$ to $R^{64}$ may each independently represent a hydrogen atom, an alkyl group having 1 to 12 carbon atoms, an alkoxy group having 1 to 12 carbon atoms, a cycloalkyl group, an aryl group, or an aralkyl group.

From the viewpoint of the electron transport property, $R^{61}$ and $R^{64}$ in formula (P6) preferably each independently represent an alkyl group having 3 to 12 carbon atoms, an alkoxy group having 3 to 12 carbon atoms, a cycloalkyl group, an aryl group, or an aralkyl group, more preferably each independently represent a branched alkyl group having 3 to 12 carbon atoms, a branched alkoxy group having 3 to 12 carbon atoms, a cycloalkyl group, an aryl group, or an aralkyl group, yet more preferably each independently represent a branched alkyl having 3 to 8 carbon atoms or a branched alkoxy group having 3 to 8 carbon atoms, and particularly preferably each independently represent a t-butyl group.

From the viewpoint of the electron transport property, $R^{62}$ and $R^{64}$ in formula (P6) preferably each independently represent a hydrogen atom, an alkyl group having 1 to 8 carbon atoms, or an alkoxy group having 1 to 8 carbon atoms, more preferably each independently represent a hydrogen atom, a linear alkyl group having 1 to 4 carbon atoms, or a linear alkoxy group having 1 to 4 carbon atoms, yet more preferably each independently represent a linear alkyl group having 1 to 3 carbon atoms or a linear alkoxy group having 1 to 3 carbon atoms, and particularly preferably each independently represent a methyl group.

In formula (P6), $R^{61}$ and $R^{64}$ may be the same group.

In formula (P6), $R^{62}$ and $R^{63}$ may be the same group.

In formula (P6), $R^{61}$ and $R^{62}$ may be different groups.

In formula (P6), $R^{63}$ and $R^{64}$ may be different groups.

In the description below, example compounds of the compounds represented by formula (P6) are described, and these examples are not limiting.

| Example compound | $R^{61}$ | $R^{62}$ | $R^{63}$ | $R^{64}$ |
|---|---|---|---|---|
| 1 | $\text{-t-}C_4H_8$ | $—CH_3$ | $—CH_3$ | $\text{-t-}C_4H_9$ |
| 2 | $\text{-t-}C_4H_8$ | H | H | $\text{-t-}C_4H_9$ |
| 3 | $\text{-t-}C_4H_9$ | $—OCH_3$ | $—OCH_3$ | $\text{-t-}C_4H_9$ |
| 4 | $\text{-t-}C_4H_3O$ | $—CH_3$ | $—CH_3$ | $\text{-t-}C_4H_9O$ |
| 5 | $\text{-c-}C_6H_{11}$ | $—CH_3$ | $—CH_3$ | $\text{-c-}C_6H_{11}$ |
| 6 | $—C_6H_5$ | $—CH_3$ | $—CH_3$ | $—C_6H_5$ |
| 7 | $—CH_2C_6H_5$ | $—CH_3$ | $—CH_3$ | $—CH_2C_6H_5$ |

Abbreviations in the aforementioned example compounds are as follows.

$t\text{-}C_4H_9$: t-butyl group:

$CH_3O$: methoxy $t\text{-}C_4H_9O$: t-butoxy group $c\text{-}C_6H_{11}$: cyclohexyl group $C_6H_5$: phenyl group $C_6H_5CH_2$: benzyl group Compounds Represented by Formula (P7)

Compounds represented by formula (P7) will now be described.

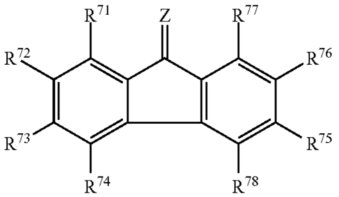

(P7)

In formula (P7), $R^{71}$, $R^{72}$, $R^{73}$, $R^{74}$, $R^{75}$, $R^{76}$, $R^{77}$, and $R^{78}$ (hereinafter may be simply referred to as "$R^{71}$ to $R^{78}$") each independently represent a hydrogen atom, an alkyl group, an alkoxy group, an aralkyl group, an aryl group, an acyl group, an alkoxycarbonyl group, or a halogen atom, and Z represents an oxygen atom or a dicyanomethylene group ($=C(CN)_2$).

Examples of the alkyl group represented by $R^{71}$ to $R^{78}$ in formula (P7) include linear or branched alkyl groups having 1 to 4 carbon atoms (preferably 1 to 3 carbon atoms), specifically, a methyl group, an ethyl group, an n-propyl group, an isopropyl group, an n-butyl group, and an isobutyl group.

Examples of the alkoxy group represented by $R^{71}$ to $R^{78}$ in formula (P7) include alkoxy groups having 1 to 4 carbon atoms (preferably 1 to 3 carbon atoms), specifically, a methoxy group, an ethoxy group, a propoxy group, and a butoxy group.

Examples of the aralkyl group represented by $R^{71}$ to $R^{78}$ in formula (P7) include groups represented by -L-Ar, where L represents an alkylene group and Ar represents an aryl group.

Examples of the alkylene group represented by L include linear or branched alkylene groups having 1 to 12 carbon atoms, specifically, a methylene group, an ethylene group, an n-propylene group, an isopropylene group, an n-butylene group, an isobutylene group, a sec-butylene group, a tert-butylene group, an n-pentylene group, an isopentylene group, a neopentylene group, and a tert-pentylene group.

Examples of the aryl group represented by Ar include a phenyl group, a methylphenyl group, a dimethylphenyl group, and an ethylphenyl group.

Specific examples of the aralkyl group represented by $R^{71}$ to $R^{78}$ in formula (P7) include a benzyl group, a methylbenzyl group, a dimethylbenzyl group, a phenylethyl group, a methylphenylethyl group, a phenylpropyl group, and a phenylbutyl group.

Examples of the aryl group represented by $R^{71}$ to $R^{78}$ in formula (P7) include a phenyl group, a methylphenyl group, a dimethylphenyl group, and an ethylphenyl group. Among these, a phenyl group is preferable.

Examples of the acyl group (—C(═O)—RAC where RAC represents a hydrocarbon group) represented by $R^{71}$ to $R^{78}$ in formula (P7) include acyl groups having 1 to 10 carbon atoms (preferably 1 to 6 carbon atoms and more preferably 1 to 3 carbon atoms), specifically, an acetyl group, a propanoyl group, a benzoyl group, and a cyclohexanecarbonyl group.

Examples of the alkyl group, the alkoxy group, the aralkyl group, the aryl group, and the alkoxycarbonyl group represented by $R^{71}$ to $R^{78}$ in formula (P7) include the same groups as the alkyl groups, the alkoxy groups, the aralkyl groups, the aryl groups, and the alkoxycarbonyl groups represented by $R^{11}$ to $R^{18}$ in formula (P1).

The alkyl group, the alkoxy group, the aralkyl group, the aryl group, and the alkoxycarbonyl group represented by $R^{71}$ to $R^{78}$ in formula (P7) may each have a substituent the same as the substituent for the alkyl group, the alkoxy group, the aralkyl group, the aryl group, and the alkoxycarbonyl group represented by $R^{11}$ to $R^{18}$ in formula (1).

The acyl group represented by $R^{71}$ to $R^{78}$ in formula (P7) may have a substituent the same as the substituent for the alkyl group represented by $R^{11}$ to $R^{18}$ in formula (P1).

Examples of the halogen atom represented by $R^{71}$ to $R^{78}$ in formula (P7) include a fluorine atom, a chlorine atom, a bromine atom, and an iodine atom.

In the group represented by -$L^{181}$-O—$R^{182}$ represented by $R^{78}$ in formula (P7), $L^{181}$ represents an alkylene group and $R^{182}$ represents an alkyl group having 8 or more carbon atoms (long chain alkyl group).

Examples of the alkylene group represented by $L^{181}$ include linear or branched alkylene groups having 1 to 12 carbon atoms, specifically, a methylene group, an ethylene group, an n-propylene group, an isopropylene group, an n-butylene group, an isobutylene group, a sec-butylene group, a tert-butylene group, an n-pentylene group, an isopentylene group, a neopentylene group, and a tert-pentylene group.

The long chain alkyl group represented by $R^{182}$ may be any alkyl group having 8 or more carbon atoms, and preferably has 8 to 12 carbon atoms from the viewpoint of suppressing cracking in the photosensitive layer. The long chain alkyl group may be linear or branched and is preferably linear.

Examples of the linear alkyl group having 8 to 12 carbon atoms include an n-octyl group, an n-nonyl group, an n-decyl group, an n-undecyl group, and an n-dodecyl group.

Examples of the branched alkyl groups having 8 to 12 carbon atoms include an isooctyl group, a sec-octyl group, a tert-octyl group, an isononyl group, a sec-nonyl group, a tert-nonyl group, an isodecyl group, a sec-decyl group, and a tert-decyl group.

The compound represented by formula (P7) may have only one long chain alkyl group in a molecule or two or more long chain alkyl groups in a molecule. The number of long chain alkyl groups contained in one molecule of the compound represented by formula (P7) is preferably 1 or more and 3 or less and more preferably 1 or more and 2 or less from the viewpoint of suppressing cracking in the photosensitive layer.

In one exemplary embodiment, from the viewpoint of the electron transport property, the compounds represented by formula (P7) may have $R^{71}$ to $R^{77}$ each independently representing a hydrogen atom, a halogen atom, or an alkyl group and $R^{78}$ representing a linear alkyl group having 8 or less carbon atoms.

In the description below, example compounds of the compounds represented by formula (P7) are described, and these examples are not limiting. Note that an example compound number below is hereinafter indicated as an example compound (7-number). Specifically, for example, an example compound 5 is referred to as an "example compound (7-5).

| Example compound | $R^{71}$ | $R^{72}$ | $R^{73}$ | $R^{74}$ | $R^{75}$ | $R^{76}$ | $R^{77}$ | $R^{76}$ | Z |
|---|---|---|---|---|---|---|---|---|---|
| 1 | H | H | H | H | H | H | H | —C(═O)—O—$CH_3$ | ═C(CN)$_2$ |
| 2 | H | H | H | H | H | H | H | —C(═O)—O—$C_2H_5$ | ═C(CN)$_2$ |
| 3 | H | H | H | H | H | H | H | —C(═O)—O-n-$C_4H_9$ | ═C(CN)$_2$ |
| 4 | H | H | H | H | H | H | H | —C(═O)—O-t-$C_4H_9$ | ═C(CN)$_2$ |
| 5 | H | H | H | H | H | H | H | —C(═O)—O-n-$C_6H_{17}$ | ═C(CN)$_2$ |
| 6 | H | H | H | H | H | H | H | —C(═O)—O-n-$CH_2$—CH($C_2H_5$)—$C_4H_9$ | ═C(CN)$_2$ |
| 7 | H | H | H | H | H | H | H | —C(═O)—O-n-$C_4H_9$ | O |
| 8 | H | H | H | H | H | H | H | —C(═O)—O-n-$CH_2$—CH($C_2H_5$)—$C_4H_9$ | O |

The group represented by $R^{78}$ in formula (P7) may be an alkoxycarbonyl group (—C(═O)—O—$R^{78A}$) from the viewpoint of the electron transport property. $R^{78A}$ represents an alkyl group having 8 or more carbon atoms (long chain alkyl group) or -$L^{181}$-O—$R^{182}$ where $L^{181}$ represents an alkylene group and $R^{182}$ represents an alkyl group having 8 or more carbon atoms (long chain alkyl group).

Abbreviations in the aforementioned example compounds are as follows.

═C(CN)$_2$: dicyanomethylene group

Compounds Represented by Formula (P8)

Compounds represented by formula (P8) will now be described.

(P8)

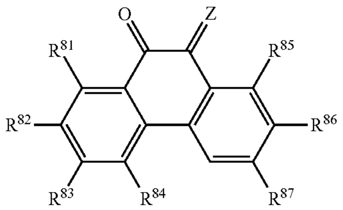

In formula (P8), $R^{81}$, $R^{82}$, $R^{83}$, $R^{84}$, $R^{85}$, $R^{86}$, and $R^{87}$ (hereinafter may be simply referred to as "$R^{81}$ to $R^{87}$") each independently represent a hydrogen atom, an alkyl group, an alkoxy group, an aralkyl group, an aryl group, an acyl group, an alkoxycarbonyl group, or a halogen atom, and Z represents an oxygen atom or a dicyanomethylene group ($=C(CN)_2$).

Examples of the alkyl group, the alkoxy group, the aralkyl group, the aryl group, the acyl group, the alkoxycarbonyl group, and the halogen atom represented by $R^{81}$ to $R^{87}$ in formula (P8) include the same groups and atoms as the alkyl groups, the alkoxy groups, the aralkyl groups, the aryl groups, the alkoxycarbonyl groups, and the halogen atoms represented by $R^{71}$ to $R^{78}$ in formula (P7).

The acyl group represented by $R^{81}$ to $R^{87}$ in formula (P8) may have a substituent the same as the substituent for the alkyl group represented by $R^{11}$ to $R^{18}$ in formula (P1).

In the description below, example compounds of the compounds represented by formula (P8) are described, and these examples are not limiting. Note that an example compound number below is hereinafter indicated as an example compound (8-number). Specifically, for example, an example compound 5 is referred to as an "example compound (8-5).

| Example compound | $R^{81}$ | $R^{82}$ | $R^{83}$ | $R^{84}$ | $R^{85}$ | $R^{86}$ | $R^{87}$ | Z |
|---|---|---|---|---|---|---|---|---|
| 1 | H | H | H | H | H | H | H | O |
| 2 | H | —Br | H | H | H | H | H | O |
| 3 | H | H | —Br | H | H | H | —Br | O |
| 4 | H | —CN | H | H | H | H | H | O |
| 5 | $—CH_3$ | H | H | H | H | H | H | O |
| 6 | H | $—OCH_3$ | H | H | H | H | H | O |
| 7 | $—CH_2CH_3$ | H | H | H | H | $—CH_3$ | H | O |
| 8 | H | H | $—C(=O)CH_3$ | H | H | H | H | O |
| 9 | H | H | H | H | H | H | H | $=C(CN)_2$ |
| 10 | $—CH_3$ | H | H | H | H | $—CH_3$ | H | $=C(CN)_2$ |

Abbreviations in the aforementioned example compounds are as follows.

$C(=O)CH_3$: acetyl group $OCH_3$: methoxy group

CN: cyano group $CH_2C_6H_5$: benzyl group $=C(CN)_2$: dicyanomethylene group

From the viewpoints of chargeability and electron transport property, the electron transport compound particle content relative to the total mass of the undercoat layer is preferably 30 mass % or more and 85 mass % or less, more preferably 50 mass % or more and 80 mass % or less, yet more preferably 52 mass % or more and 75 mass % or less, and most preferably 55 mass % or more and 70 mass % or less.

Binder Resin

The undercoat layer may contain a binder resin.

The binder resin contained in the undercoat layer may be any binder resin. Examples of the binder resin contained in the undercoat layer include polyurethane, polyvinyl alcohol resins, polyvinyl acetal resins (including polyvinyl butyral, that is, a butyral resin), casein resins, polyamide resins, cellulose resins, gelatin, polyester resins, unsaturated polyester resins, methacrylic resins, acrylic resins, polyvinyl chloride resins, polyvinyl acetate resins, vinyl chloride-vinyl acetate-maleic anhydride resins, silicone resins, silicone-alkyd resins, urea resins, phenolic resins, phenol-formaldehyde resins, melamine resins, alkyd resins, and epoxy resins. These binder resins may be used alone or in combination.

Polyurethane may be contained as the binder resin in the undercoat layer from the viewpoint of further improving the charge-retaining property of the undercoat layer. The use of polyurethane as the binder resin yields an excellent charge-retaining property compared to when other types of binder resins are used. The possible mechanism behind is that polyurethane has a strong effect of suppressing injection of inner charges (dark carrier) of the electron transport compound particles in the undercoat layer into the electron transport compound particles described above (trapping effect), and thus, potential decay on the surface of the photoreceptor is inhibited.

Polyurethane may be synthesized by polyaddition reaction between a polyisocyanate and a polyol.

Examples of the polyisocyanate include diisocyanates such as methylene diisocyanate, ethylene diisocyanate, isophorone diisocyanate, hexamethylene diisocyanate, 1,4-cyclohexane diisocyanate, 2,4-toluene diisocyanate, 2,6-toluene diisocyanate, 1,3-xylylene diisocyanate, 1,5-naphthalene diisocyanate, m-phenylene diisocyanate, p-phenylene diisocyanate, 3,3'-dimethyl-4,4'-diphenylmethane diisocyanate, 3,3'-dimethylbiphenylene diisocyanate, 4,4'-biphenylene diisocyanate, dicyclohexylmethane diisocyanate, and methylenebis(4-cyclohexylisocyanate); and isocyanurates obtained by trimerization of these diisocyanates; and blocked isocyanates obtained by blocking the isocyanate groups of the aforementioned diisocyanates with blocking agents. In particular, polyisocyanate is preferably polyfunctional, such as an isocyanurate having two or more isocyanate groups. These polyisocyanates may be used alone or in combination.

Examples of the polyol include diols such as ethylene glycol, 1,2-propanediol, 1,3-propanediol, 1,2-butanediol, 1,3-butanediol, 2,3-butanediol, 2,2-dimethyl-1,3-propanediol, 1,2-pentanediol, 1,4-pentanediol, 1,5-pentanediol, 2,4-pentanediol, 3,3-dimethyl-1,2-butanediol, 2-ethyl-2-methyl-1,3-propanediol, 1,2-hexanediol, 1,5-hexanediol, 1,6-hexanediol, 2,5-hexanediol, 2-methyl-2,4-pentanediol, 2,2-diethyl-1,3-propanediol, 2,4-dimethyl-2,4-pentanediol, 1,7-heptanediol, 2-methyl-2-propyl-1,3-propanediol, 2,5-dimethyl-2,5-hexanediol, 2-ethyl-1,3-hexanediol, 1,2-octanediol, 1,8-octanediol, 2,2,4-trimethyl-1,3-pentanediol, 1,4-cyclohexanedimethanol, hydroquinone, diethylene glycol, triethylene glycol, dipropylene glycol, tripropylene glycol, polyethylene glycol, polypropylene glycol, poly(oxytetramethylene)glycol, 4,4'-dihydroxydiphenyl-2,2-propane, and 4,4'-dihydroxyphenylsulfone.

Other examples of the polyols include polyester polyols, polycarbonate polyols, polycaprolactone polyols, polyether polyols, and polyvinyl butyrals. These polyols may be used alone or in combination.

Examples of the urethane curing catalyst (in other words, the catalyst for a polyaddition reaction between a polyisocyanate and a polyol) include amine compounds, organic acid metal salts, and organic metal complexes.

Examples of the amine compounds include 1,4-diazabicyclo(2,2,2) octane, N, N-dimethylcyclohexylamine, N-methyldicyclohexylamine, N, N,N', N'-tetramethylpropylenediamine, N-ethylmorpholine, N-methylmorpholine, N, N-dimethylethanolamine, 1,8-diazabicyclo[5,4,0]undecene-7 (DBU), and salts thereof.

Examples of the organic acid metal salts and organic metal complexes include dibutyltin laurate, stannous octoate, bismuth octylate, bismuth naphthenate, bismuth salicylate, zinc octylate, zinc naphthenate, and zinc salicylate.

Examples of the commercially available products of urethane curing catalysts include K-KAT series produced by King Industries, Inc., such as bismuth carboxylate catalysts such as K-KAT348, K-KAT XC-C227, K-KAT XK-628, and K-KAT XK-640, aluminum complex catalysts such as K-KAT5218, and zirconium complex catalysts such as K-KAT4205, K-KAT6212, and K-KATA209; and ORGATIX series produced by Matsumoto Fine Chemical Co., Ltd., such as titanium complex catalysts such as TA-30 and TC-750.

When a butyral resin is contained as the binder resin, from the viewpoints of the chargeability and electron transport property, the butyral resin content relative to the total mass of the undercoat layer is preferably 0.5 mass % or more and 20 mass % or less, and more preferably 1 mass % or more and 10 mass % or less.

Polyurethane preferably accounts for 80 mass % or more and 100 mass % or less, more preferably 90 mass % or more and 100 mass % or less, and yet more preferably 95 mass % or more and 100 mass % or less of the total amount of the binder resins contained in the undercoat layer.

The mass ratio of the total amount of the electron transport compound particles contained in the undercoat layer to the amount of the polyurethane contained in the undercoat layer is preferably 90:10 to 50:50 and more preferably 80:20 to 70:30.

Inorganic Particles

The undercoat layer may contain inorganic particles, but is preferably free of inorganic particles from the viewpoint of chargeability.

Examples of the inorganic particles include inorganic particles having a powder resistance (volume resistivity) of $10^2$ Ωcm or more and $10^{11}$ Ωcm or less.

As the inorganic particles having this resistance value, for example, metal oxide particles such as tin oxide particles, titanium oxide particles, zinc oxide particles, or zirconium oxide particles are preferable, and, in particular, zinc oxide particles are preferable.

The BET specific surface area of the inorganic particles may be, for example, 10 $m^2/g$ or more. At a specific surface area of 10 $m^2/g$ or more, degradation of chargeability tends to be reduced.

The volume-average particle diameter of the inorganic particles is, for example, 50 nm or more and 2000 nm or less (preferably 60 nm or more and 1000 nm or less).

The inorganic particle content relative to, for example, the binder resin is preferably 10 mass % or more and 80 mass % or less and more preferably 40 mass % or more and 80 mass % or less.

The surfaces of the inorganic particles may be treated. Two or more types of inorganic particles subjected to different surface treatment or having different particle diameters may be mixed and used.

Examples of the surface treating agent include silane coupling agents, titanate coupling agents, aluminum coupling agents, and surfactants. In particular, silane coupling agents are preferable, and an amino-group-containing silane coupling agent is more preferable.

Examples of the amino-group-containing silane coupling agent include, but are not limited to, 3-aminopropyltriethoxysilane, N-2-(aminoethyl)-3-aminopropyltrimethoxysilane, N-2-(aminoethyl)-3-aminopropylmethyldimethoxysilane, and N, N-bis(2-hydroxyethyl)-3-aminopropyltriethoxysilane.

Two or more silane coupling agents may be mixed and used. For example, an amino-group-containing silane coupling agent may be used in combination with another silane coupling agent. Examples of this other silane coupling agent include, but are not limited to, vinyltrimethoxysilane, 3-methacryloxypropyl-tris(2-methoxyethoxy) silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N, N-bis(2-hydroxyethyl)-3-aminopropyltriethoxysilane, and 3-chloropropyltrimethoxysilane.

The surface treatment method that uses a surface treating agent may be any known method, for example, may be a dry method or a wet method.

The amount of the surface treating agent relative to the inorganic particles may be, for example, 0.5 mass % or more and 10 mass % or less.

The inorganic particle content relative to the inorganic particles is preferably 0.01 mass % or more and 20 mass % or less and more preferably 0.01 mass % or more and 10 mass % or less.

The undercoat layer may contain an electron accepting compound (acceptor compound) together with the inorganic particles.

Examples of the electron accepting compound include electron transport compounds such as quinone compounds such as chloranil and bromanil; tetracyanoquinodimethane compounds; fluorenone compounds such as 2,4,7-trinitrofluorenone and 2,4,5,7-tetranitro-9-fluorenone; oxadiazole compounds such as 2-(4-biphenyl)-5-(4-t-butylphenyl)-1,3,4-oxadiazole, 2,5-bis(4-naphthyl)-1,3,4-oxadiazole, and 2,5-bis(4-diethylaminophenyl)-1,3,4 oxadiazole; xanthone compounds; thiophene compounds; and diphenoquinone compounds such as 3,3', 5,5'-tetra-t-butyldiphenoquinone.

In particular, a compound having an anthraquinone structure may be used as the electron accepting compound. The compound having an anthraquinone structure is, for example, preferably a hydroxyanthraquinone compound, an aminoanthraquinone compound, an aminohydroxyanthraquinone compound, or the like, and is specifically preferably anthraquinone, alizarin, quinizarin, anthrarufin, or purpurin.

The electron accepting compound may be dispersed in the undercoat layer along with the inorganic particles, or may be contained in the undercoat layer by being attached to the surfaces of the inorganic particles.

Examples of the method for attaching the electron accepting compound to the surfaces of the inorganic particles include a dry method and a wet method.

The dry method is, for example, a method that involves adding, to inorganic particles being stirred with a mixer at a large shear force, an electron accepting compound directly, dropwise as a solution prepared by dissolving the electron accepting compound in an organic solvent, or via spraying along with dry air or nitrogen gas so that the electron accepting compound attaches to the surfaces of the inorganic particles. When the electron accepting compound is added dropwise or sprayed, the temperature may be lower than or equal to the boiling point of the solvent. After the dropwise addition or spraying of the electron accepting compound, baking may be further performed at a temperature equal to or higher than 100° C. The temperature and time for baking may be any as long as the electrophotographic properties are obtained.

The wet method is, for example, a method that involves adding an electron accepting compound while dispersing inorganic particles in a solvent by stirring, ultrasonically, or by using a sand mill, an attritor, or a ball mill, stirring or dispersing the resulting mixture, and then removing the solvent so that the electron accepting compound attaches to the surfaces of the inorganic particles. The solvent is removed by, for example, filtration or distillation. After removing the solvent, baking may be further performed at a temperature equal to or higher than 100° C. The temperature and time for baking may be any as long as the electrophotographic properties are obtained. In the wet method, the water contained in the inorganic particles may be removed before adding the electron accepting compound, and examples of such a method include a method that removes the water by stirring and heating the inorganic particles in a solvent and a method of removing water by boiling together with the solvent.

Here, attaching the electron accepting compound may be performed before, during, or after the inorganic particles are surface-treated with a surface treating agent.

The electron accepting compound content relative to, for example, the inorganic particles is preferably 0.01 mass % or more and 20 mass % or less and more preferably 0.01 mass % or more and 10 mass % or less.

Additives

The undercoat layer may contain various additives to improve the electrical characteristics, environmental stability, and image quality.

Examples of the additives include known materials such as electron transporting pigments based on polycondensed materials and azo materials, zirconium chelate compounds, titanium chelate compounds, aluminum chelate compounds, titanium alkoxide compounds, organic titanium compounds, and silane coupling agents. The silane coupling agent is used to surface-treat the inorganic particles as mentioned above, but may be further added as an additive to the undercoat layer.

Examples of this silane coupling agent serving as an additive include vinyltrimethoxysilane, 3-methacryloxypropyl-tris(2-methoxyethoxy) silane, 2-(3,4-epoxycyclohexyl) ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N, N-bis(2-hydroxyethyl)-3-aminopropyltriethoxysilane, and 3-chloropropyltrimethoxysilane.

Examples of the zirconium chelate compounds include zirconium butoxide, zirconium ethyl acetoacetate, zirconium triethanolamine, acetylacetonate zirconium butoxide, ethyl acetoacetate zirconium butoxide, zirconium acetate, zirconium oxalate, zirconium lactate, zirconium phosphonate, zirconium octanoate, zirconium naphthenate, zirconium laurate, zirconium stearate, zirconium isostearate, methacrylate zirconium butoxide, stearate zirconium butoxide, and isostearate zirconium butoxide.

Examples of the titanium chelate compounds include tetraisopropyl titanate, tetra-n-butyl titanate, butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compounds include aluminum isopropylate, monobutoxyaluminum diisopropylate, aluminum butyrate, diethylacetoacetate aluminum diisopropylate, and aluminum tris(ethylacetoacetate).

These additives may be used alone, or as a mixture or a polycondensation product of two or more compounds.

Other Properties of Undercoat Layer

The thickness of the undercoat layer is preferably 1 μm or more and more preferably 3 μm or more. From the viewpoint of improving the charge-retaining property, the thickness of the undercoat layer is preferably 50 μm or less, more preferably 30 μm or less, and yet more preferably 20 μm or less.

The undercoat layer may have a volume resistivity of $1\times10^{10}$ Ωcm or more and $1\times10^{12}$ Ωcm or less.

The undercoat layer may have a Vickers hardness of 35 or more.

In order to suppress moire images, the surface roughness (ten-point average roughness) of the undercoat layer may be adjusted to be in the range of 1/(4n) (n represents the refractive index of the overlying layer) to ½ of λ representing the laser wavelength used for exposure.

In order to adjust the surface roughness, resin particles and the like may be added to the undercoat layer. Examples of the resin particles include silicone resin particles and crosslinking polymethyl methacrylate resin particles. The surface of the undercoat layer may be polished to adjust the surface roughness. Examples of the polishing method include buff polishing, sand blasting, wet honing, and grinding.

Method for Forming Undercoat Layer

The undercoat layer may be formed by any known method, and, for example, may be formed by preparing an undercoat layer-forming solution by adding the above-mentioned components to a solvent, forming a coating film of this solution, and drying and, if desired, heating the coating film.

Examples of the solvent used for preparing the undercoat layer-forming solution include known organic solvents, such as alcohol solvents, aromatic hydrocarbon solvents, halogenated hydrocarbon solvents, ketone solvents, ketone alcohol solvents, ether solvents, and ester solvents.

Specific examples of the solvent include common organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene. A solvent having at least one hydroxyl group (for example, an alcohol) or an ether solvent (for example, tetrahydrofuran) may be used as the solvent.

Examples of the method for dispersing the electron transport compound particles in preparing the undercoat layer-forming solution include known methods that use a roll mill, a ball mill, a vibrating ball mill, an attritor, a sand mill, a colloid mill, and a paint shaker.

Since the electron transport compound particles are sparingly soluble in organic solvents, an organic solvent may be used for dispersing. Examples of the dispersing method include known methods that use a roll mill, a ball mill, a vibrating ball mill, an attritor, a sand mill, a colloid mill, and a paint shaker.

Examples of the method for applying the undercoat layer-forming solution to the conductive support include common methods such as a blade coating method, a wire bar coating method, a spray coating method, a dip coating method, a bead coating method, an air knife coating method, and a curtain coating method.

Conductive Support

Examples of the conductive support include metal plates, metal drums, and metal belts that contain metals (aluminum, copper, zinc, chromium, nickel, molybdenum, vanadium, indium, gold, platinum, etc.) or alloys (stainless steel etc.). Other examples of the conductive support include paper sheets, resin films, and belts coated, vapor-deposited, or laminated with conductive compounds (for example, conductive polymers and indium oxide), metals (for example, aluminum, palladium, and gold), or alloys.

Here, "conductive" means having a volume resistivity of less than $10^{13}$ Ωcm.

The surface of the conductive support may be roughened to a center-line average roughness Ra of 0.04 μm or more and 0.5 μm or less in order to suppress interference fringes that occur when the electrophotographic photoreceptor used in a laser printer is irradiated with a laser beam. When incoherent light is used as a light source, there is no need to roughen the surface to reduce interference fringes, but roughening the surface suppresses generation of defects due to irregularities on the surface of the conductive support and thus is desirable for extending the lifetime.

Examples of the surface roughening method include a wet honing method with which an abrasive suspended in water is sprayed onto a conductive support, a centerless grinding with which a conductive support is pressed against a rotating grinding stone to perform continuous grinding, and an anodization treatment.

Another example of the surface roughening method does not involve roughening the surface of a conductive support but involves dispersing a conductive or semi-conductive powder in a resin and forming a layer of the resin on a surface of a conductive support so as to create a rough surface by the particles dispersed in the layer.

The surface roughening treatment by anodization involves forming an oxide film on the surface of a conductive support by anodization by using a metal (for example, aluminum) conductive support as the anode in an electrolyte solution. Examples of the electrolyte solution include a sulfuric acid solution and an oxalic acid solution. However, a porous anodized film formed by anodization is chemically active as is, is prone to contamination, and has resistivity that significantly varies depending on the environment. Thus, a pore-sealing treatment may be performed on the porous anodized film so as to seal fine pores in the oxide film by volume expansion caused by hydrating reaction in pressurized steam or boiling water (a metal salt such as a nickel salt may be added) so that the oxide is converted into a more stable hydrous oxide.

The thickness of the anodized film may be, for example, 0.3 μm or more and more preferably 15 μm or more. When the thickness is within this range, a barrier property against injection tends to be exhibited, and the increase in residual potential caused by repeated use tends to be suppressed.

The conductive support may be subjected to a treatment with an acidic treatment solution or a Boehmite treatment.

The treatment with an acidic treatment solution is, for example, conducted as follows. First, an acidic treatment solution containing phosphoric acid, chromic acid, and hydrofluoric acid is prepared. The blend ratios of phosphoric acid, chromic acid, and hydrofluoric acid in the acidic treatment solution may be, for example, in the range of 10 mass % or more and 11 mass % or less for phosphoric acid, in the range of 3 mass % or more and 5 mass % or less for chromic acid, and in the range of 0.5 mass % or more and 2 mass % or less for hydrofluoric acid; and the total concentration of these acids may be in the range of 13.5 mass % or more and 18 mass % or less. The treatment temperature may be, for example, 42° C. or higher and 48° C. or lower. The thickness of the coating film may be 0.3 μm or more and more and 15 μm or less.

The Boehmite treatment is conducted by immersing a conductive support in pure water at 90° C. or higher and 100° C. or lower for 5 to 60 minutes or by bringing a conductive support into contact with pressurized steam at 90° C. or higher and 120° C. or lower for 5 to 60 minutes. The thickness of the coating film may be 0.1 μm or more and more and 5 μm or less. The resulting product may be further anodized by using an electrolyte solution, such as adipic acid, boric acid, a borate salt, a phosphate salt, a phthalate salt, a maleate salt, a benzoate salt, a tartrate salt, or a citrate salt, that has low film-dissolving power.

Intermediate Layer

Although not illustrated in the drawings, an intermediate layer may be further formed between the undercoat layer and the photosensitive layer.

The intermediate layer is, for example, a layer that contains a resin. Examples of the resin used in the intermediate layer include polymer compounds such as acetal resins (for example, polyvinyl butyral), polyvinyl alcohol resins, polyvinyl acetal resins, casein resins, polyamide resins, cellulose resins, gelatin, polyurethane resins, polyester resins, methacrylic resins, acrylic resins, polyvinyl chloride resins, polyvinyl acetate resins, vinyl chloride-vinyl acetate-maleic anhydride resins, silicone resins, silicone-alkyd resins, phenol-formaldehyde resins, and melamine resins.

The intermediate layer may contain an organic metal compound. Examples of the organic metal compound used in the intermediate layer include organic metal compounds containing metal atoms such as zirconium, titanium, aluminum, manganese, and silicon.

These compounds used in the intermediate layer may be used alone, or two or more compounds may be used as a mixture or a polycondensation product.

In particular, the intermediate layer may be a layer that contains an organic metal compound that contains zirconium atoms or silicon atoms.

The intermediate layer may be formed by any known method, and, for example, may be formed by preparing an intermediate layer-forming solution by adding the above-mentioned components to a solvent, forming a coating film of this solution, and drying and, if desired, heating the coating film.

Examples of the application method for forming the intermediate layer include common methods such as a dip coating method, a lift coating method, a wire bar coating method, a spray coating method, a blade coating method, a knife coating method, and a curtain coating method.

The thickness of the intermediate layer may be set within the range of, for example, 0.1 μm or more and 3 μm or less. The intermediate layer may be used as the undercoat layer.

Charge Generation Layer

The charge generation layer is a layer that contains a charge generation material and a binder resin. The charge generation layer may be a layer formed by vapor-depositing a charge generation material. The vapor deposited layer of the charge generation material may be used when an incoherent light source such as a light emitting diode (LED) or an organic electro-luminescence (EL) image array is used.

Examples of the charge generation material include azo pigments such as bisazo and trisazo pigments; fused-ring aromatic pigments such as dibromoanthanthrone; perylene pigments; pyrrolopyrrole pigments; phthalocyanine pigments; zinc oxide; and trigonal selenium.

Among these, in order to be compatible to the near-infrared laser exposure, a metal phthalocyanine pigment or a metal-free phthalocyanine pigment may be used as the charge generation material. Specific examples thereof include hydroxygallium phthalocyanine, chlorogallium phthalocyanine, dichlorotin phthalocyanine, and titanyl phthalocyanine.

In order to be compatible to the near ultraviolet laser exposure, the charge generation material may be a fused-ring aromatic pigment such as dibromoanthanthrone, a thioindigo pigment, a porphyrazine compound, zinc oxide, trigonal selenium, a bisazo pigment, or the like.

When an incoherent light source, such as an LED or an organic EL image array having an emission center wavelength in the range of 450 nm or more and 780 nm or less, is used, the charge generation material described above may be used; however, from the viewpoint of the resolution, when the photosensitive layer is as thin as 20 μm or less, the electric field intensity in the photosensitive layer is increased, charges injected from the conductive support are decreased, and image defects known as black spots tend to occur. This is particularly noticeable when a charge generation material, such as trigonal selenium or a phthalocyanine pigment, that is of a p-conductivity type and is likely to generate dark current is used.

In contrast, when an n-type semiconductor, such as a fused-ring aromatic pigment, a perylene pigment, or an azo pigment, is used as the charge generation material, dark current rarely occurs and, even when the thickness is small, image defects known as black spots can be suppressed.

Determination of the n-type is performed by a common time-of-flight method and by the polarity of the flowing photocurrent, and a material in which electrons rather than holes are likely to flow as a carrier is determined to be of an n-type.

The binder resin used in the charge generation layer is selected from a wide range of insulating resins. Alternatively, the binder resin may be selected from organic photoconductive polymers, such as poly-N-vinylcarbazole, polyvinyl anthracene, polyvinyl pyrene, and polysilane.

Examples of the binder resin include, polyvinyl butyral resins, polyarylate resins (polycondensates of bisphenols and aromatic dicarboxylic acids etc.), polycarbonate resins, polyester resins, phenoxy resins, vinyl chloride-vinyl acetate copolymers, polyamide resins, acrylic resins, polyacrylamide resins, polyvinyl pyridine resins, cellulose resins, urethane resins, epoxy resins, casein, polyvinyl alcohol resins, and polyvinyl pyrrolidone resins. Here, "insulating" means having a volume resistivity higher than or equal to $10^{13}$ Ωcm.

These binder resins may be used alone or in combination as a mixture.

The blend ratio of the charge generation material to the binder resin may be 10:1 to 1:10 in terms of mass ratio.

The charge generation layer may contain other known additives.

The charge generation layer may be formed by any known method, and, for example, may be formed by preparing a charge generation layer-forming solution by adding the above-mentioned components to a solvent, forming a coating film of this solution, and drying and, if desired, heating the coating film. The charge generation layer may be a vapor deposited layer of a charge generation material. The charge generation layer may be formed by vapor deposition particularly when a fused-ring aromatic pigment or a perylene pigment is used as the charge generation material.

Specific examples of the solvent for preparing the charge generation layer-forming solution include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in combination as a mixture.

In order to disperse particles (for example, the charge generation material) in the charge generation layer-forming solution, a media disperser such as a ball mill, a vibrating ball mill, an attritor, a sand mill, or a horizontal sand mill, or a media-less disperser such as stirrer, an ultrasonic disperser, a roll mill, or a high-pressure homogenizer is used, for example. Examples of the high-pressure homogenizer include a collision-type homogenizer in which a dispersion in a high-pressure state is dispersed through liquid-liquid collision or liquid-wall collision, and a penetration-type homogenizer in which a fluid in a high-pressure state is caused to penetrate through fine channels.

In dispersing, it is effective to set the average particle diameter of the charge generation material in the charge generation layer-forming solution to 0.5 μm or less, preferably 0.3 μm or less, and more preferably 0.15 μm or less.

Examples of the method for applying the charge generation layer-forming solution to the undercoat layer (or the intermediate layer) include common methods such as a blade coating method, a wire bar coating method, a spray coating method, a dip coating method, a bead coating method, an air knife coating method, and a curtain coating method.

The thickness of the charge generation layer is preferably set within the range of 0.1 μm or more and 5.0 μm or less, and more preferably within the range of 0.2 μm or more and 2.0 μm or less.

Charge Transport Layer

The charge transport layer is, for example, a layer that contains a charge transport material and a binder resin. The charge transport layer may be a layer that contains a polymer charge transport material.

Examples of the charge transport material include electron transport compounds such as quinone compounds such as p-benzoquinone, chloranil, bromanil, and anthraquinone; tetracyanoquinodimethane compounds; fluorenone compounds such as 2,4,7-trinitrofluorenone; xanthone compounds; benzophenone compounds; cyanovinyl compounds; and ethylene compounds. Other examples of the charge transport material include hole transport compounds such as triarylamine compounds, benzidine compounds, aryl alkane compounds, aryl-substituted ethylene compounds, stilbene compounds, anthracene compounds, and hydrazone compounds. These charge transport materials may be used alone or in combination, but are not limiting.

From the viewpoint of charge mobility, the charge transport material may be a triarylamine derivative represented by structural formula (a-1) below or a benzidine derivative represented by structural formula (a-2) below.

(a-1)

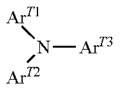

In structural formula (a-1), $Ar^{T1}$, $Ar^{T2}$, and $Ar^{T3}$ each independently represent a substituted or unsubstituted aryl group, $—C_6H_4—C(R^{T4})═C(R^{T5})(R^{T6})$, or $—C_6H_4—CH═CH—CH═C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent for each of the groups described above include halogen atoms, alkyl groups having 1 to 5 carbon atoms, and alkoxy groups having 1 to 5 carbon atoms. Examples of the substituent for each of the groups described above include substituted amino groups substituted with alkyl groups having 1 to 3 carbon atoms.

(a-2)

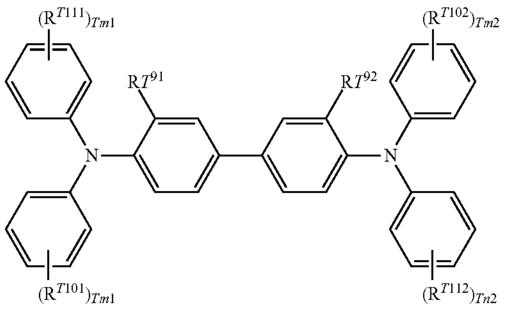

In structural formula (a-2), $R^{T91}$ and $R^{T92}$ each independently represent a hydrogen atom, a halogen atom, an alkyl group having 1 to 5 carbon atoms, or an alkoxy group having 1 to 5 carbon atoms. $R^{T101}$, $R^{T102}$, $R^{T111}$, and $R^{T112}$ each independently represent a halogen atom, an alkyl group having 1 to 5 carbon atoms, an alkoxy group having 1 to 5 carbon atoms, an amino group substituted with an alkyl group having 1 or 2 carbon atoms, a substituted or unsubstituted aryl group, $—C(R^{T12})═C(R^{T13})(R^{T14})$, or $—CH═CH—CH═C(R^{T15})(R^{T16})$ where $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or more and 2 or less.

Examples of the substituent for each of the groups described above include halogen atoms, alkyl groups having 1 to 5 carbon atoms, and alkoxy groups having 1 to 5 carbon atoms. Examples of the substituent for each of the groups described above include substituted amino groups substituted with alkyl groups having 1 to 3 carbon atoms.

Here, among the triarylamine derivatives represented by structural formula (a-1) and the benzidine derivatives represented by structural formula (a-2) above, a triarylamine derivative having $—C_6H_4—CH═CH—CH═C(R^{T7})(R^{T8})$ or a benzidine derivative having $—CH═CH—CH═C(R^{T15})(R^{T16})$ may be used from the viewpoint of the charge mobility.

Examples of the polymer charge transport material that can be used include known charge transport materials such as poly-N-vinylcarbazole and polysilane. In particular, a polyester polymer charge transport material is preferable. These polymer charge transfer materials may be used alone or each in combination with a binder resin.

Examples of the binder resin used in the charge transport layer include polycarbonate resins, polyester resins, polyarylate resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone alkyd resins, phenol-formaldehyde resins, styrene-alkyd resins, poly-N-vinylcarbazole, and polysilane. Among these, a polycarbonate resin or a polyarylate resin may be used as the binder resin. These binder resins are used alone or in combination.

The blend ratio of the charge transport material to the binder resin may be 10:1 to 1:5 in terms of mass ratio.

The charge transport layer may contain other known additives.

The charge transport layer may be formed by any known method, and, for example, may be formed by preparing a charge transport layer-forming solution by adding the above-mentioned components to a solvent, forming a coating film of this solution, and drying and, if desired, heating the coating film.

Examples of the solvent used to prepare the charge transport layer-forming solution include common organic solvents such as aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in combination as a mixture.

Examples of the method for applying the charge transport layer-forming solution to the charge generation layer include common methods such as a blade coating method, a wire bar coating method, a spray coating method, a dip coating method, a bead coating method, an air knife coating method, and a curtain coating method.

The thickness of the charge transport layer is preferably set within the range of 5 μm or more and 50 μm or less, and more preferably within the range of 10 μm or more and 30 μm or less.

Protection Layer

The protection layer is disposed on the photosensitive layer as needed. The protection layer is provided for the purpose of preventing chemical changes in the photosensitive layer during charging and further improving the mechanical strength of the photosensitive layer.

Thus, the protection layer may be a layer formed of a cured film (crosslinked film). Examples of such a layer are 1) and 2) below.

1) a layer composed of a cured film of a composition that contains a reactive group-containing charge transport material that has a reactive group and a charge transport skeleton in the same molecule (in other words, a layer that contains a polymer or crosslinked body of the reactive group-containing charge transport material)
2) a layer composed of a cured film of a composition that contains a non-reactive charge transport material and a reactive group-containing non-charge transport material that has no charge transport skeleton but has a reactive group (in other words, a layer that contains a polymer or crosslinked body of the non-reactive charge transport material and the reactive group-containing non-charge transport material)

Examples of the reactive group contained in the reactive group-containing charge transport material include known reactive groups such as chain-polymerizable groups, an epoxy group, —OH, —OR (where R represents an alkyl group), $—NH_2$, —SH, —COOH, or $—SiR^{Q1}_{3-Qn}(OR^{Q2})_{Qn}$ (where $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3).

The chain-polymerizable group may be any radical-polymerizable functional group, and an example thereof is a functional group having a group that contains at least a carbon-carbon double bond. A specific example thereof is a group that contains at least one selected from a vinyl group, a vinyl ether group, a vinyl thioether group, a styryl group (vinylphenyl group), an acryloyl group, a methacryloyl group, and derivatives thereof. Among these, the chain-polymerizable group may be a group that contains at least one selected from a vinyl group, a styryl group (vinylphenyl group), an acryloyl group, a methacryloyl group, and derivatives thereof due to their excellent reactivity.

The charge transport skeleton of the reactive group-containing charge transport material may be any known structure used in the electrophotographic photoreceptor, and examples thereof include skeletons that are derived from nitrogen-containing hole transport compounds, such as triarylamine compounds, benzidine compounds, and hydrazone compounds, and that are conjugated with nitrogen atoms. Among these, a triarylamine skeleton is preferable.

The reactive-group-containing charge transport material that has such a reactive group and a charge transport skeleton, the non-reactive charge transport material, and the reactive-group-containing non-charge transport material may be selected from among known materials.

The protection layer may contain other known additives.

The protection layer may be formed by any known method. For example, a coating film is formed by using a protection layer-forming solution prepared by adding the above-mentioned components to a solvent, dried, and, if needed, cured such as by heating.

Examples of the solvent used to prepare the protection layer-forming solution include aromatic solvents such as toluene and xylene, ketone solvents such as methyl ethyl ketone, methyl isobutyl ketone, and cyclohexanone, ester solvents such as ethyl acetate and butyl acetate, ether solvents such as tetrahydrofuran and dioxane, cellosolve solvents such as ethylene glycol monomethyl ether, and alcohol solvents such as isopropyl alcohol and butanol. These solvents are used alone or in combination as a mixture.

The protection layer-forming solution may be a solvent-free solution.

Examples of the application method used to apply the protection layer-forming solution onto the photosensitive layer (for example, the charge transport layer) include common methods such as a dip coating method, a lift coating method, a wire bar coating method, a spray coating method, a blade coating method, a knife coating method, and a curtain coating method.

The thickness of the protection layer is preferably set within the range of 1 μm or more and 20 μm or less, and more preferably within the range of 2 μm or more and 10 μm or less.

Single-Layer-Type Photosensitive Layer

A single-layer-type photosensitive layer (charge generation/charge transport layer) is, for example, a layer that contains a charge generation material, a charge transport material, and, if needed, a binder resin and other known additives. These materials are the same as those described in relation to the charge generation layer and the charge transport layer.

The amount of the charge generation material contained in the single-layer-type photosensitive layer relative to the total mass may be 0.1 mass % or more and 10 mass or less, and is preferably 0.8 mass % or more and 5 mass % or less. The amount of the charge transport material contained in the single-layer-type photosensitive layer relative to the total mass may be 5 mass % or more and 50 mass % or less.

The method for forming the single-layer-type photosensitive layer is the same as the method for forming the charge generation layer and the charge transport layer.

The thickness of the single-layer-type photosensitive layer may be, for example, 5 μm or more and 50 μm or less, and is preferably 10 μm or more and 40 μm or less.

Image Forming Apparatus and Process Cartridge

An image forming apparatus of an exemplary embodiment includes an electrophotographic photoreceptor, a charging unit that charges a surface of the electrophotographic photoreceptor, an electrostatic latent image forming unit that forms an electrostatic latent image on the charged surface of the electrophotographic photoreceptor, a developing unit that develops the electrostatic latent image on the surface of the electrophotographic photoreceptor by using a developer that contains a toner so as to form a toner image, and a transfer unit that transfers the toner image onto a surface of a recording medium. The electrophotographic photoreceptor of the exemplary embodiment described above is used as the electrophotographic photoreceptor.

The image forming apparatus of the exemplary embodiment is applied to a known image forming apparatus, examples of which include an apparatus equipped with a fixing unit that fixes the toner image transferred onto the surface of the recording medium; a direct transfer type apparatus with which the toner image formed on the surface of the electrophotographic photoreceptor is directly transferred to the recording medium; an intermediate transfer type apparatus with which the toner image formed on the surface of the electrophotographic photoreceptor is first transferred to a surface of an intermediate transfer body and then the toner image on the surface of the intermediate transfer body is transferred to the surface of the recording medium; an apparatus equipped with a cleaning unit that cleans the surface of the electrophotographic photoreceptor after the toner image transfer and before charging; an apparatus equipped with a charge erasing unit that erases the charges on the surface of the electrophotographic photoreceptor by applying the charge erasing light after the toner image transfer and before charging; and an apparatus equipped with an electrophotographic photoreceptor heating member that elevates the temperature of the electrophotographic photoreceptor to reduce the relative temperature.

In the intermediate transfer type apparatus, the transfer unit includes, for example, an intermediate transfer body having a surface onto which a toner image is to be transferred, a first transfer unit that conducts first transfer of the toner image on the surface of the electrophotographic photoreceptor onto the surface of the intermediate transfer body, and a second transfer unit that conducts second transfer of the toner image on the surface of the intermediate transfer body onto a surface of a recording medium.

The image forming apparatus of this exemplary embodiment may be of a dry development type or a wet development type (development type that uses a liquid developer).

In the image forming apparatus of the exemplary embodiment, for example, a section that includes the electrophotographic photoreceptor may be configured as a cartridge structure (process cartridge) detachably attachable to the image forming apparatus. A process cartridge equipped with the photoreceptor of the present exemplary embodiment may be used as this process cartridge. The process cartridge may include, in addition to the electrophotographic photoreceptor, at least one selected from the group consisting of a charging unit, an electrostatic latent image forming unit, a developing unit, and a transfer unit.

Hereinafter, one example of the image forming apparatus of the exemplary embodiment is described, but this exemplary embodiment is not limiting. Only the relevant parts in the drawing are described, and descriptions for other parts are omitted.

Figure 2:
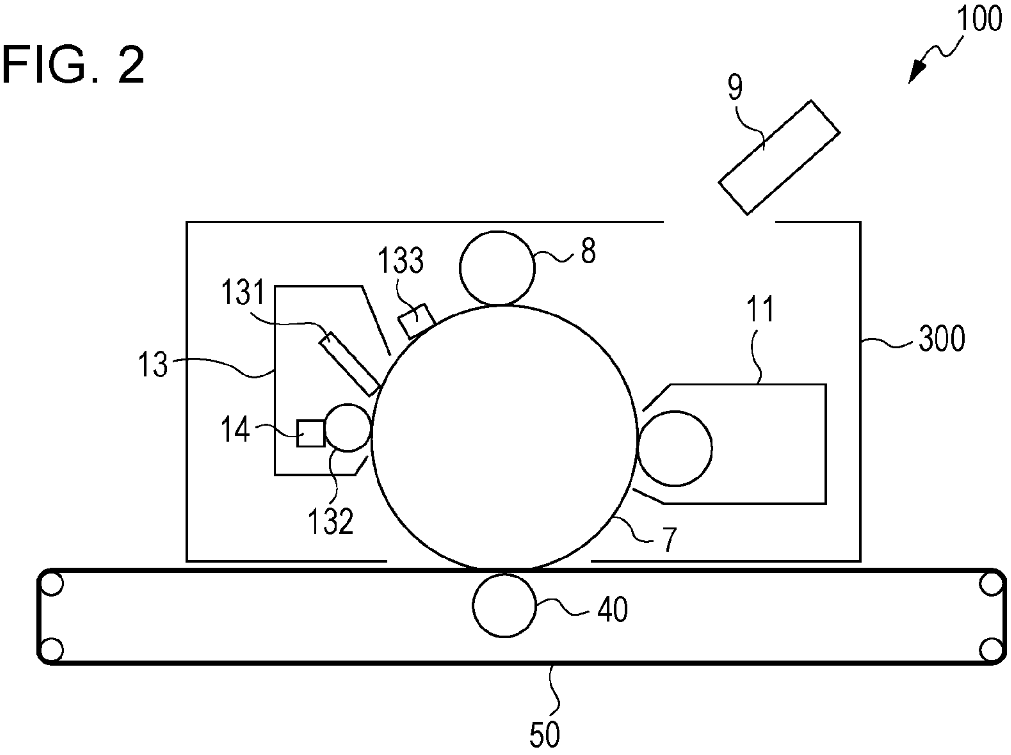
FIG. 2 is a schematic diagram illustrating one example of an image forming apparatus according to an exemplary embodiment.

FIG. 2 is a schematic diagram illustrating one example of an image forming apparatus according to an exemplary embodiment.

As illustrated in FIG. 2, an image forming apparatus 100 of this exemplary embodiment includes a process cartridge 300 equipped with an electrophotographic photoreceptor 7, an exposing device 9 (one example of the electrostatic latent image forming unit), a transfer device 40 (first transfer device), and an intermediate transfer body 50. In this image forming apparatus 100, the exposing device 9 is positioned so that light can be applied to the electrophotographic photoreceptor 7 from the opening of the process cartridge 300, the transfer device 40 is positioned to oppose the electrophotographic photoreceptor 7 with the intermediate transfer body 50 therebetween, and the intermediate transfer body 50 has a portion in contact with the electrophotographic photoreceptor 7. Although not illustrated in the drawings, a second transfer device that transfers the toner image on the intermediate transfer body 50 onto a recording medium (for example, a paper sheet) is also provided. The intermediate transfer body 50, the transfer device 40 (first transfer device), and the second transfer device (not illustrated) correspond to examples of the transfer unit.

The process cartridge 300 illustrated in FIG. 2 integrates and supports the electrophotographic photoreceptor 7, a charging device 8 (one example of the charging unit), a developing device 11 (one example of the developing unit), and a cleaning device 13 (one example of the cleaning unit) in the housing. The cleaning device 13 has a cleaning blade (one example of the cleaning member) 131, and the cleaning blade 131 is in contact with the surface of the electrophotographic photoreceptor 7. The cleaning member may take a form other than the cleaning blade 131, and may be a conductive or insulating fibrous member that can be used alone or in combination with the cleaning blade 131.

Although an example of the image forming apparatus equipped with a fibrous member 132 (roll) that supplies a lubricant 14 to the surface of the electrophotographic photoreceptor 7 and a fibrous member 133 (flat brush) that assists cleaning is illustrated in FIG. 2, these members are optional.

The features of the image forming apparatus of this exemplary embodiment will now be described.

Charging Device

Examples of the charging device 8 include contact-type chargers that use conductive or semi-conducting charging rollers, charging brushes, charging films, charging rubber blades, and charging tubes. Known chargers such as non-contact-type roller chargers, and scorotron chargers and corotron chargers that utilize corona discharge are also used.

Exposing Device

Examples of the exposing device 9 include optical devices that can apply light, such as semiconductor laser light, LED light, or liquid crystal shutter light, into a particular image shape onto the surface of the electrophotographic photoreceptor 7. The wavelength of the light source is to be within the spectral sensitivity range of the electrophotographic photoreceptor. The mainstream wavelength of the semiconductor lasers is near infrared having an oscillation wavelength at about 780 nm. However, the wavelength is not limited to this, and a laser having an oscillation wavelength on the order of 600 nm or a blue laser having an oscillation wavelength of 400 nm or more and 450 nm or less may be used. In order to form a color image, a surface-emitting laser light source that can output multi beams is also effective.

Developing Device

Examples of the developing device 11 include common developing devices that perform development by using a developer in a contact or non-contact manner. The developing device 11 is not particularly limited as long as the aforementioned functions are performed, and is selected according to the purpose. An example thereof is a known developer that has a function of attaching a one-component developer or a two-component developer to the electrophotographic photoreceptor 7 by using a brush, a roller, or the like. In particular, a development roller that retains the developer on its surface may be used.

The developer used in the developing device 11 may be a one-component developer that contains only a toner or a two-component developer that contains a toner and a carrier. The developer may be magnetic or non-magnetic. Any known developers may be used as these developers.

Cleaning Device

A cleaning blade type device equipped with a cleaning blade 131 is used as the cleaning device 13.

Instead of the cleaning blade system, a fur brush cleaning system or a development-cleaning simultaneous system may be employed.

Transfer Device

Examples of the transfer device 40 include contact-type transfer chargers that use belts, rollers, films, rubber blades, etc., and known transfer chargers such as scorotron transfer chargers and corotron transfer chargers that utilize corona discharge.

Intermediate Transfer Body

A belt-shaped member (intermediate transfer belt) that contains semi-conducting polyimide, polyamide imide, polycarbonate, polyarylate, a polyester, a rubber, or the like is used as the intermediate transfer body 50. The form of the intermediate transfer body other than the belt may be a drum.

Figure 3:
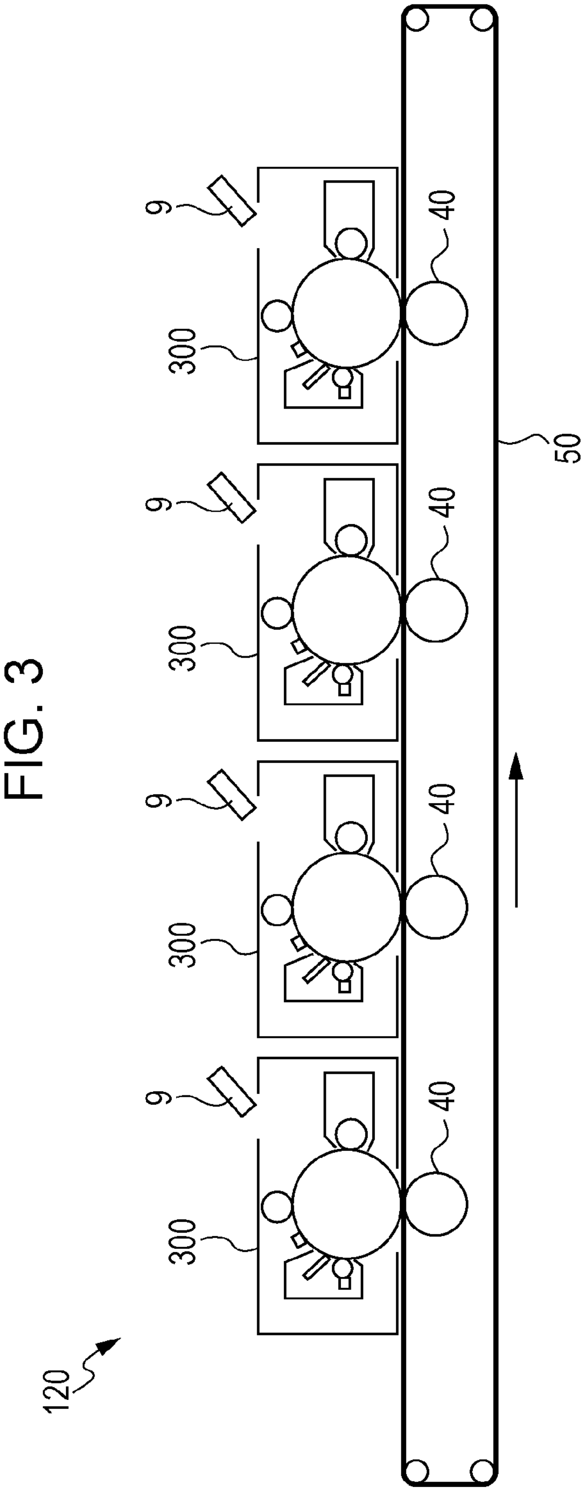
FIG. 3 is a schematic diagram illustrating another example of the image forming apparatus according to an exemplary embodiment.

FIG. 3 is a schematic diagram illustrating another example of an image forming apparatus according to an exemplary embodiment.

An image forming apparatus 120 illustrated in FIG. 3 is a tandem-system multicolor image forming apparatus equipped with four process cartridges 300. In the image forming apparatus 120, four process cartridges 300 are arranged in parallel on the intermediate transfer body 50, and one electrophotographic photoreceptor is used for one color. The image forming apparatus 120 is identical to the image forming apparatus 100 except for the tandem system.

EXAMPLES

The electrophotographic photoreceptor of the exemplary embodiment will now be specifically described by way of examples. The materials, amounts used, ratios, treatment procedures, etc., that are described in the examples below are subject to alterations and modifications as appropriate without departing from the gist of the exemplary embodiment. Thus, the interpretation of the scope of the electrophotographic photoreceptor of the exemplary embodiment is not limited by the specific examples described below.

Example 1

Pulverizing Electron Transport Compound Particles

Into a zirconia container, 6.4 g of example compound (1-1) of formula (P1) (produced by Clariant AG), 72 g of zirconia beads having a diameter of 0.3 mm, and 1.0 g of sodium chloride are placed, and the resulting mixture is pulverized with a planetary mill device (P-7 Classic line produced by Fritsch GmbH) at a rotation rate of 500 rpm for 2 hours.

After pulverization, electron transport compound particles are separated by filtration while washing the zirconia beads with 500 ml of distilled water. The obtained water dispersion of the electron transport compound particles are centrifuged, and the supernatant is removed by decantation to isolate the electron transport compound. The isolated pigment is repeatedly washed with water until the electrical conductivity reaches 10 μS/cm or less, and the washed electron transport compound is dried in a freeze dryer for 48 hours to obtain 4.9 g of pulverized electron transport compound particles.

The aspect ratio of the electron transport compound particles is 7.2 before pulverization and 4.8 after pulverization.

Formation of Undercoat Layer

The obtained electron transport compound particles: 32 parts by mass, a blocked isocyanate (trade name: Sumidur 3175 produced by Sumitomo Bayer Urethane Co., Ltd.): 6 parts by mass, a compound represented by structural formula (AK-1) below: 1 part by mass, and methyl ethyl ketone: 25 parts by mass are mixed for 30 minutes. Thereto, a butyral resin (trade name: S-LEC BM-1 produced by SEKISUI CHEMICAL CO., LTD.): 5 parts by mass, silicone balls (trade name: Tospearl 120 produced by Momentive Performance Materials Japan LLC): 3 parts by mass, and, a Toray Dow Corning silicone oil serving as a leveling agent (trade name: SH29PA produced by Dow Corning Corp.): 0.01 parts by mass are added, and the resulting mixture is dispersed in a sand mill for 1.8 hours (in other words, the dispersing time is set to 1.8 hours), as a result of which an undercoat layer-forming coating solution is obtained.

(AK-1)

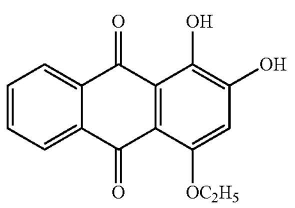

The obtained undercoat layer-forming coating solution is applied to an aluminum substrate (conductive support) having a diameter of 47 mm, a length of 357 mm, and a thickness of 1 mm by a dip coating method, the applied solution is dried and cured at 180° C. for 30 minutes to obtain an undercoat layer having a thickness of 5 μm.

Formation of Charge Generation Layer 1

Hydroxygallium phthalocyanine having diffraction peaks at Bragg angles (20+) 0.2° of at least 7.5°, 16.3°, 25.0°, and 28.3° in an X-ray diffraction spectrum taken by using CuKα X-ray is prepared as a charge generation material. A mixture of 15 parts by mass of hydroxygallium phthalocyanine, 10 parts by mass of a vinyl chloride-vinyl acetate copolymer resin (VMCH produced by Nippon Unicar Company Limited), and 200 parts by mass of n-butyl acetate is dispersed in a sand mill for 4 hours by using glass beads having a diameter of 1 mm. To the obtained dispersion, 175 parts by mass of n-butyl acetate and 180 parts by mass of methyl ethyl ketone are added, and the resulting mixture is stirred to obtain a coating solution for forming a charge generation layer. This coating solution is applied to the undercoat layer by dip-coating, and dried at 146° C. for 10 minutes. As a result, a charge generation layer 1 having a thickness of 0.2 μm is formed.

Formation of Charge Transport Layer 1

To 800 parts by mass of tetrahydrofuran, 38 parts by mass of a charge transport agent (HT-1), 10 parts by mass of a charge transport agent (HT-2), and 52 parts by mass of a polycarbonate (A) (viscosity-average molecular weight: 48,000) are added and dissolved. Thereto, 8 parts by mass of an ethylene tetrafluoride resin (LUBRON L5 produced by Daikin Industries Ltd., average particle diameter: 300 nm) is added, and the resulting mixture is dispersed for 2 hours at 5,500 rpm using a homogenizer (ULTRA-TURRAX produced by IKA Japan) to obtain a coating solution for forming a charge transport layer. This coating solution is applied to the charge generation layer 1 by dip-coating, and dried at 148° C. for 40 minutes. As a result, a charge transport layer 1 having a thickness of 26 μm is formed. An electrophotographic photoreceptor of Example 1 is obtained as a result of these processes.

Charge transport agent (HT-1)

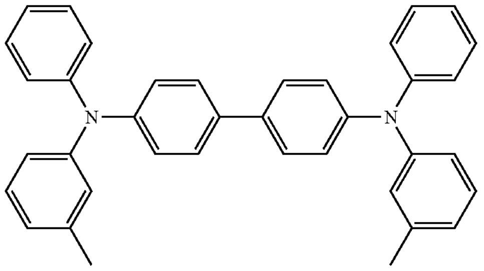

Charge transport agent (HT-2)

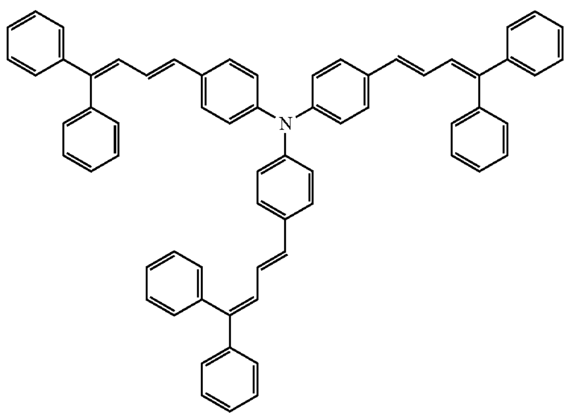

Polycarbonate (A)

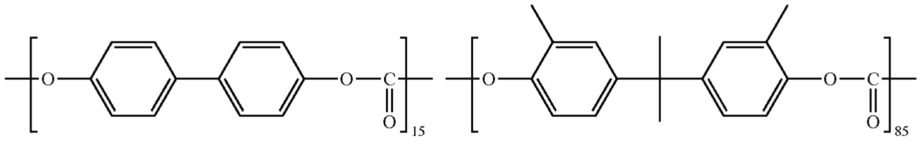

Examples 2 to 14 and Comparative Examples 1 to 5

Electrophotographic photoreceptors are obtained as in Example 1 except that whether the electron transport compound particles are pulverized, formation of the undercoat layer, formation of the charge generation layer 1, and formation of the charge transport layer 1 in Example 1 are altered as appropriate as indicated in Table.

Formation of Charge Generation Layer 2

Hydroxygallium phthalocyanine having diffraction peaks at Bragg angles (2θ+) 0.2° of at least 7.5°, 16.3°, 25.0°, and 28.3° in an X-ray diffraction spectrum taken by using Cukα X-ray is prepared as a charge generation material. A mixture of 15 parts by mass of hydroxygallium phthalocyanine, 10 parts by mass of a vinyl chloride-vinyl acetate copolymer resin (VMCH produced by Nippon Unicar Company Limited), and 200 parts by mass of n-butyl acetate is dispersed in a sand mill for 4 hours by using glass beads having a diameter of 1 mm. To the obtained dispersion, 175 parts by mass of n-butyl acetate and 180 parts by mass of methyl ethyl ketone are added, and the resulting mixture is stirred to obtain a coating solution for forming a charge generation layer. This coating solution is applied to the undercoat layer by dip-coating, and dried at 80° C. for 15 minutes. As a result, a charge generation layer 2 having a thickness of 0.2 μm is formed.

Formation of Charge Transport Layer 2

To 800 parts by mass of tetrahydrofuran, 38 parts by mass of a charge transport agent (HT-1), 10 parts by mass of a charge transport agent (HT-2), and 52 parts by mass of a polycarbonate (A) (viscosity-average molecular weight: 48,000) are added and dissolved. Thereto, 8 parts by mass of an ethylene tetrafluoride resin (LUBRON L5 produced by Daikin Industries Ltd., average particle diameter: 300 nm) is added, and the resulting mixture is dispersed for 2 hours at 5,500 rpm using a homogenizer (ULTRA-TURRAX produced by IKA Japan) to obtain a coating solution for forming a charge transport layer. This coating solution is applied to the charge generation layer 1 by dip-coating, and dried at 140° C. for 40 minutes. As a result, a charge transport layer 2 having a thickness of 40 μm is formed.

Evaluation

Evaluation of Sensitivity (Electron Transport Property)

The following evaluation is performed in a high-temperature, high-humidity (28° C., 85% RH) environment, an indoor environment (20° C., 50% RH), and a low-temperature, low-humidity environment (10° C., 10% RH).

The sensitivity is evaluated as a half-decay exposure observed when the electrophotographic photoreceptor is charged to +800 V. Specifically, an electrostatic copy paper tester (electrostatic analyzer EPA-8300 produced by Kawaguchi Electric Works Co., Ltd.) is used to charge the electrophotographic photoreceptor of each of the examples to +800 V in an environment having a temperature of 20° C. and a relative humidity of 40%. Subsequently, light from a tungsten lamp is processed with a monochromator into 780 nm monochromic light, and the light dose is adjusted so that the light dose is 1 μW/$cm^2$ on the surface of the electrophotographic photoreceptor. Next, the half-decay exposure (μJ/$cm^2$) at which the surface potential Vo (V) of the electrophotographic photoreceptor immediately after charging decreases to a half by light irradiation is measured. The obtained half-decay exposure is classified by the following standard. The results are shown in Table.

A: The half-decay exposure is 0.08 μJ/$cm^2$ or less.

B: The half-decay exposure is more than 0.08 μJ/$cm^2$ but not more than 0.10 μJ/$cm^2$.

C: The half-decay exposure is more than 0.10 μJ/$cm^2$ but not more than 0.12 ρJ/$cm^2$.

D: The half-decay exposure is more than 0.12 μJ/$cm^2$.

Evaluation of Leakage Resistance (Chargeability)

The following evaluation is performed in a high-temperature, high-humidity (30° C., 85% RH) environment, an indoor environment (20° C., 50% RH), and a low-temperature, low-humidity environment (10° C., 10% RH).

Evaluation of suppressing degradation of chargeability caused by leakage current is conducted by utilizing a phenomenon in which dot-like image defects occur due to electric current that flows when a carbon fiber penetrates through the photosensitive layer and the undercoat layer and reaches the conductive substrate.

The aforementioned photoreceptor is loaded onto DocuCentre-V C7775 produced by FUJIFILM Business Innovation Corp., and a black image having an image density of 20% is continuously output on 40,000 sheets of A4 paper by using a mixture of a developer and carbon fibers (average diameter: 7 μm, average length: 120 μm) in an amount of 0.15 mass % relative to the amount of the developer. The presence/absence of dot-like image defects on the 30,000th sheet is observed with naked eye, and the extent of the image defects is classified as A to D below. The results are shown in Table.

A: The number of dot-like image defects is less than 5.

B: The number of dot-like image defects is 5 or more and less than 10.

C: The number of dot-like image defects is 10 or more and less than 20.

D: The number of dot-like image defects is 20 or more.

Image Quality Evaluation

The following evaluation is performed in an indoor environment (20° C., 50% RH).

The photoreceptor is loaded onto DocuCentre-V C7775 produced by FUJIFILM Business Innovation Corp., and, after output on 10 sheets of A4 paper, an image chart that includes halftone images having image densities of 5%, 10%, 20%, 80%, 90%, and 100% and a solid image (all images are in black) is output. The difference from the set density is evaluated by naked eye and classified as A to D below.

A: There is no difference from the set density.

B: There is a slight difference from the set density, but the difference does not pose any practical problem.

C: There is a difference from the set density, but the difference is practically acceptable.

D: There is a difference from the set density, and the difference poses practical problem.

TABLE

| | Crystalline electron transport compound particles Type | Crystalline electron transport compound particles Amount added (parts by mass) | Pulverization of electron transport compound particles | Half-width of maximum intensity peak (°) | Maximum value Nmax among orientation indices N | Average aspect ratio of electron transport compound particles | Thickness of undercoat layer (μm) | Type of charge generation layer | Type of charge transport layer |
|---|---|---|---|---|---|---|---|---|---|
| Example 1 | 1-1 | 32 | Performed | 0.3 | 2.3 | 4.8 | 5.0 | 1 | 1 |
| Example 2 | 3-8 | 32 | Performed | 0.2 | 2.4 | 2.3 | 5.0 | 1 | 1 |
| Example 3 | 2-1 | 32 | Performed | 0.4 | 2.6 | 4.2 | 5.0 | 1 | 1 |
| Example 4 | 1-2 | 32 | Performed | 0.3 | 2.6 | 3.8 | 5.0 | 1 | 1 |
| Example 5 | 3-9 | 32 | Performed | 3.7 | 2.9 | 4.9 | 5.0 | 1 | 1 |
| Example 6 | 4-7 | 32 | Performed | 0.5 | 2.4 | 2.5 | 5.0 | 1 | 1 |
| Example 7 | 1-1 | 36 | Performed | 0.3 | 2.2 | 4.5 | 5.0 | 1 | 1 |
| Example 8 | 1-1 | 30 | Performed | 0.3 | 2.3 | 4.7 | 5.0 | 1 | 1 |
| Example 9 | 1-1 | 32 | Performed | 0.3 | 2.3 | 4.6 | 5.0 | 2 | 1 |
| Example 10 | 1-1 | 32 | Performed | 0.3 | 2.2 | 4.7 | 5.0 | 1 | 2 |
| Example 11 | 1-1 | 32 | Performed | 0.3 | 2.3 | 4.8 | 10.0 | 1 | 1 |
| Example 12 | 4-7 | 32 | Performed | 0.5 | 2.3 | 4.7 | 10.0 | 1 | 1 |
| Example 13 | 1-1 | 32 | Performed | 0.3 | 2.3 | 4.8 | 15.0 | 1 | 1 |
| Example 14 | 4-7 | 32 | Performed | 0.5 | 2.3 | 4.7 | 15.0 | 1 | 1 |
| Comparative Example 1 | 1-1 | 32 | Not performed | 0.3 | 3.1 | 7.2 | 5.0 | 1 | 1 |
| Comparative Example 2 | 2-1 | 32 | Not performed | 0.4 | 4.0 | 6.8 | 5.0 | 1 | 1 |
| Comparative Example 3 | 3-8 | 32 | Not performed | 0.2 | 7.5 | 6.5 | 5.0 | 1 | 1 |
| Comparative Example 4 | 1-2 | 32 | Not performed | 0.3 | 8.4 | 12.0 | 5.0 | 1 | 1 |
| Comparative Example 5 | 3-9 | 32 | Not performed | 3.2 | 4.2 | 5.4 | 5.0 | 1 | 1 |

| | Evaluation results: Chargeability High-temperature, high-humidity | Chargeability Indoor | Chargeability Low-temperature, low-humidity | Electron transport property High-temperature, high-humidity | Electron transport property Indoor | Electron transport property Low-temperature, low-humidity | Image quality |
|---|---|---|---|---|---|---|---|
| Example 1 | A | A | A | A | A | A | A |
| Example 2 | A | A | A | A | A | A | A |
| Example 3 | B | B | B | B | A | A | B |
| Example 4 | A | A | B | B | A | A | B |
| Example 5 | B | B | C | C | B | B | C |
| Example 6 | A | A | A | A | A | A | A |
| Example 7 | B | A | A | A | A | A | A |
| Example 8 | A | A | A | A | B | B | B |
| Example 9 | B | B | A | A | A | B | A |
| Example 10 | A | A | A | A | A | A | A |

TABLE-continued

| | | | | | | | |
|---|---|---|---|---|---|---|---|
| Example 11 | A | A | A | A | A | B | A |
| Example 12 | A | A | A | A | A | B | A |
| Example 13 | A | A | A | A | A | B | A |
| Example 14 | A | A | A | A | B | B | A |
| Comparative Example 1 | D | D | B | B | C | D | D |
| Comparative Example 2 | D | D | C | C | D | D | D |
| Comparative Example 3 | D | D | C | D | D | D | D |
| Comparative Example 4 | D | D | D | D | D | D | D |
| Comparative Example 5 | D | D | D | C | C | C | D |

Note that, in the table, the numbers indicating the type of the crystalline electron transport compound particles are the same as those of the example compounds of formulae (P1) to (P8) described above.

The table reveals that the electrophotographic photoreceptors of Examples have excellent chargeability and electron transport property compared to the electrophotographic photoreceptors of Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An electrophotographic photoreceptor comprising:

a conductive support; and an undercoat layer and a photosensitive layer stacked on the conductive support, wherein the undercoat layer contains crystalline electron transport compound particles, in X-ray diffraction measurement performed on the undercoat layer in a thickness direction, a maximum intensity peak has a half-width of 5° or less, and a maximum value Nmax among orientation indices N expressed by equation (1) below is 1 or more and 3 or less:

$$\text{Orientation index} = \frac{\dfrac{I_1}{\sum I_1}}{\dfrac{I_2}{\sum I_2}} \quad (1)$$

where $I_1$ represents a relative integral intensity of each of peaks in the X-ray diffraction measurement performed on the undercoat layer in the thickness direction, and $I_2$ represents a relative integral intensity of each of peaks in X-ray diffraction measurement performed on the undercoat layer processed into a powder form having a volume-average particle diameter of 5 μm or less.

2. The electrophotographic photoreceptor according to claim 1, wherein the half-width is 1.0° or less.

3. The electrophotographic photoreceptor according to claim 2, wherein the half-width is 0.7° or less.

4. The electrophotographic photoreceptor according to claim 1, wherein the maximum value Nmax is 1 or more and 2.7 or less.

5. The electrophotographic photoreceptor according to claim 4, wherein the maximum value Nmax is 1 or more and 2.5 or less.

6. The electrophotographic photoreceptor according to claim 1, wherein the electron transport compound particles are particles of a compound represented by one of formulae (P1) to (P8) below:

(P1)

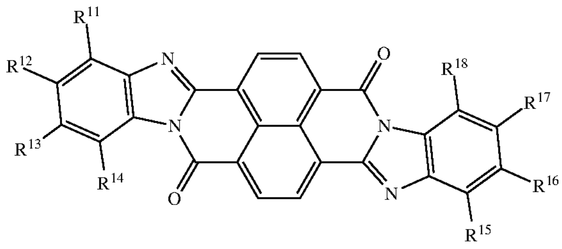

(P2)

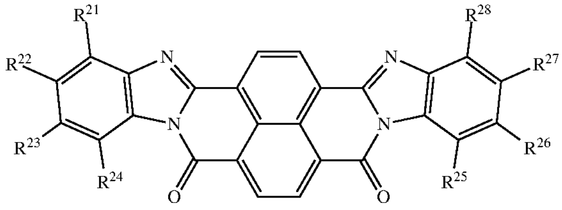

(P3)

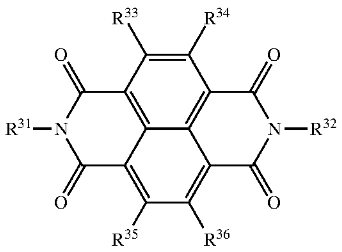

-continued (P4)

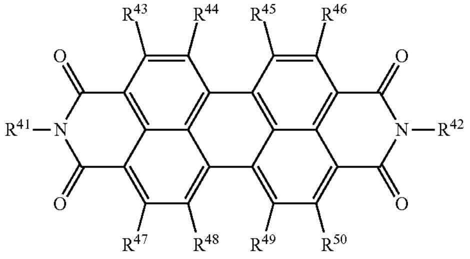

(P5)

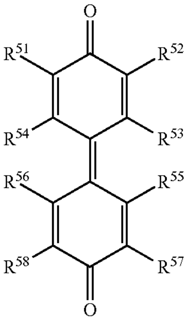

(P6)

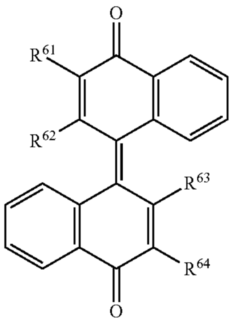

(P7)

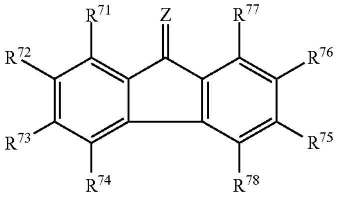

(P8)

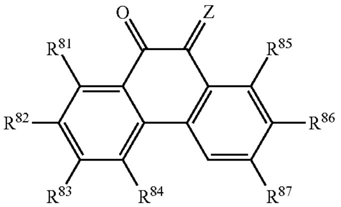

in formula (P1), $R^{11}$, $R^{12}$, $R^{13}$, $R^{14}$, $R^{15}$, $R^{16}$, $R^{17}$, and $R^{18}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{11}$ and $R^{12}$ taken together may form a ring and so may $R^{12}$ and $R^{13}$, and $R^{13}$ and $R^{14}$, and $R^{15}$ and $R^{16}$ taken together may form a ring and so may $R^{16}$ and $R^{17}$, and $R^{17}$ and $R^{18}$, in formula (P2), $R^{21}$, $R^{22}$, $R^{23}$, $R^{24}$, $R^{25}$, $R^{26}$, $R^{27}$, and $R^{28}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{21}$ and $R^{22}$ taken together may form a ring and so may $R^{22}$ and $R^{23}$, and $R^{23}$ and $R^{24}$, and $R^{25}$ and $R^{26}$ taken together may form a ring and so may $R^{26}$ and $R^{27}$, and $R^{27}$ and $R^{28}$, in formula (P3), $R^{31}$, $R^{32}$, $R^{33}$, $R^{34}$, $R^{35}$, and $R^{36}$ each independently represent a hydrogen atom, an alkyl group, an alkoxy group, an aralkyl group, an aryl group, an alkoxycarbonyl group, or a halogen atom, in formula (P4), $R^{41}$, $R^{42}$, $R^{43}$, $R^{44}$, $R^{45}$, $R^{46}$, $R^{47}$, $R^{48}$, $R^{49}$, and $R^{50}$ each independently represent a hydrogen atom, an alkyl group, an alkoxy group, an aralkyl group, an aryl group, an alkoxycarbonyl group, or a halogen atom, in formula (P5), $R^{51}$, $R^{52}$, $R^{53}$, $R^{54}$, $R^{55}$, $R^{56}$, $R^{57}$, and $R^{58}$ each independently represent a hydrogen atom, an alkyl group, an alkoxy group, an aralkyl group, an aryl group, an alkoxycarbonyl group, or a halogen atom, in formula (P6), $R^{61}$, $R^{62}$, $R^{63}$, and $R^{64}$ each independently represent a hydrogen atom, an alkyl group, an alkoxy group, an aralkyl group, an aryl group, an alkoxycarbonyl group, or a halogen atom, in formula (P7), $R^{71}$, $R^{72}$, $R^{73}$, $R^{74}$, $R^{75}$, $R^{76}$, $R^{77}$, and $R^{78}$ each independently represent a hydrogen atom, an alkyl group, an alkoxy group, an aralkyl group, an aryl group, an acyl group, an alkoxycarbonyl group, or a halogen atom, and Z represents an oxygen atom or a dicyanomethylene group ($=C(CN)_2$), and in formula (P8), $R^{81}$, $R^{82}$, $R^{83}$, $R^{84}$, $R^{85}$, $R^{86}$, and $R^{87}$ each independently represent a hydrogen atom, an alkyl group, an alkoxy group, an aralkyl group, an aryl group, an acyl group, an alkoxycarbonyl group, or a halogen atom, and Z represents an oxygen atom or a dicyanomethylene group ($=C(CN)_2$).

7. The electrophotographic photoreceptor according to claim 6, wherein the electron transport compound particles are particles of a compound represented by one of formulae (P1) to (P4).

8. The electrophotographic photoreceptor according to claim 7, wherein the electron transport compound particles are particles of a compound represented by formula (P4).

9. The electrophotographic photoreceptor according to claim 1, wherein an amount of the electron transport compound particles contained relative to a total mass of the undercoat layer is 50 mass % or more and 80 mass % or less.

10. An electrophotographic photoreceptor comprising:

a conductive support; and an undercoat layer and a photosensitive layer stacked on the conductive support, wherein the undercoat layer contains crystalline electron transport compound particles, and the electron transport compound particles have an average aspect ratio of 4.5 or less, and wherein the electron transport compound particles are particles of a compound represented by one of formulae (P1) to (P8) below:

(P1)

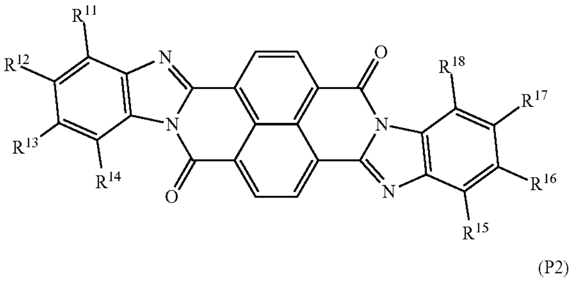

(P2)

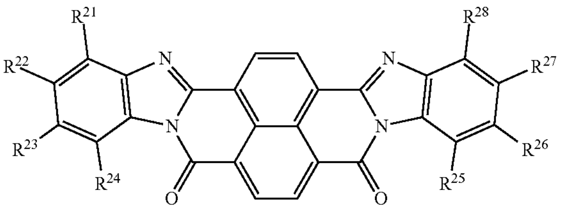

(P3)

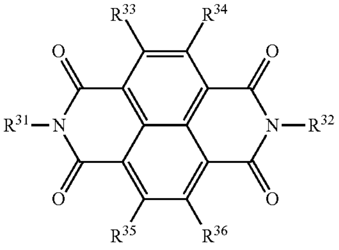

(P4)

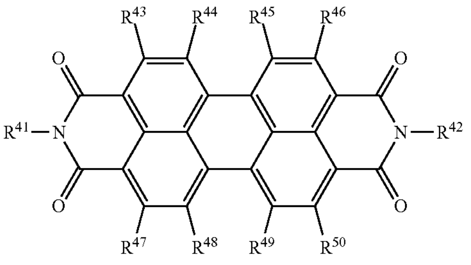

(P5)

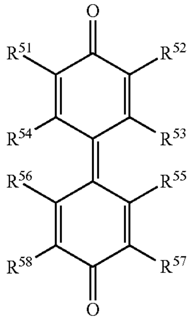

-continued (P6)

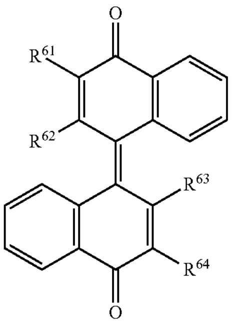

(P7)

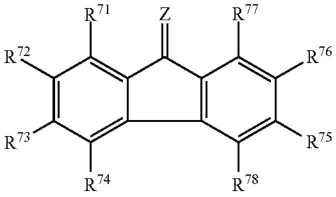

(P8)

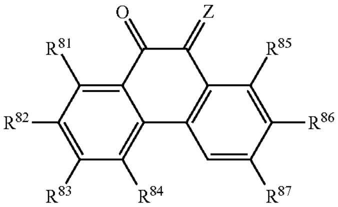

in formula (P1), $R^{11}$, $R^{12}$, $R^{13}$, $R^{14}$, $R^{15}$, $R^{16}$, $R^{17}$, and $R^{18}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{11}$ and $R^{12}$ taken together may form a ring and so may $R^{12}$ and $R^{13}$, and $R^{13}$ and $R^{14}$, and $R^{15}$ and $R^{16}$ taken together may form a ring and so may $R^{16}$ and $R^{17}$, and $R^{17}$ and $R^{18}$, in formula (P2), $R^{21}$, $R^{22}$, $R^{23}$, $R^{24}$, $R^{25}$, $R^{26}$, $R^{27}$, and $R^{28}$ each independently represent a hydrogen atom, an alkyl group, an alkoxy group, an aralkyl group, an aryl group, an aryloxy group, an alkoxycarbonyl group, an aryloxycarbonyl group, an alkoxycarbonylalkyl group, an aryloxycarbonylalkyl group, or a halogen atom, $R^{21}$ and $R^{22}$ taken together may form a ring and so may $R^{22}$ and $R^{23}$, and $R^{23}$ and $R^{24}$, and $R^{25}$ and $R^{26}$ taken together may form a ring and so may $R^{26}$ and $R^{27}$, and $R^{27}$ and $R^{28}$, in formula (P3), $R^{31}$, $R^{32}$, $R^{33}$, $R^{34}$, $R^{35}$, and $R^{36}$ each independently represent a hydrogen atom, an alkyl group, an alkoxy group, an aralkyl group, an aryl group, an alkoxycarbonyl group, or a halogen atom, in formula (P4), $R^{41}$, $R^{42}$, $R^{43}$, $R^{44}$, $R^{45}$, $R^{46}$, $R^{47}$, $R^{48}$, $R^{49}$, and $R^{50}$ each independently represent a hydrogen atom, an alkyl group, an alkoxy group, an aralkyl group, an aryl group, an alkoxycarbonyl group, or a halogen atom, in formula (P5), $R^{51}$, $R^{52}$, $R^{53}$, $R^{54}$, $R^{55}$, $R^{56}$, $R^{57}$, and $R^{58}$ each independently represent a hydrogen atom, an alkyl group, an alkoxy group, an aralkyl group, an aryl group, an alkoxycarbonyl group, or a halogen atom, in formula (P6), $R^{61}$, $R^{62}$, $R^{63}$, and $R^{64}$ each independently represent a hydrogen atom, an alkyl group, an alkoxy group, an aralkyl group, an aryl group, an alkoxycarbonyl group, or a halogen atom, in formula (P7), $R^{71}$, $R^{72}$, $R^{73}$, $R^{74}$, $R^{75}$, $R^{76}$, $R^{77}$, and $R^{78}$ each independently represent a hydrogen atom, an alkyl group, an alkoxy group, an aralkyl group, an aryl group, an acyl group, an alkoxycarbonyl group, or a halogen atom, and Z represents an oxygen atom or a dicyanomethylene group ($=C(CN)_2$), and in formula (P8), $R^{81}$, $R^{82}$, $R^{83}$, $R^{84}$, $R^{85}$, $R^{86}$, and $R^{87}$ each independently represent a hydrogen atom, an alkyl group, an alkoxy group, an aralkyl group, an aryl group, an acyl group, an alkoxycarbonyl group, or a halogen atom, and Z represents an oxygen atom or a dicyanomethylene group ($=C(CN)_2$).

11. The electrophotographic photoreceptor according to claim 10, wherein the electron transport compound particles are particles of a compound represented by one of formulae (P1) to (P4).

12. The electrophotographic photoreceptor according to claim 11, wherein the electron transport compound particles are particles of a compound represented by formula (P4).

13. The electrophotographic photoreceptor according to claim 10, wherein an amount of the electron transport compound particles contained relative to a total mass of the undercoat layer is 50 mass % or more and 80 mass % or less.

14. A process cartridge detachably attachable to an image forming apparatus, the process cartridge comprising the electrophotographic photoreceptor according to claim 1.

15. A process cartridge detachably attachable to an image forming apparatus, the process cartridge comprising the electrophotographic photoreceptor according to claim 10.

16. An image forming apparatus comprising:

the electrophotographic photoreceptor according to claim 1;

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image on the surface of the electrophotographic photoreceptor by using a developer containing a toner so as to form a toner image; and a transfer unit that transfers the toner image onto a surface of a recording medium.

17. An image forming apparatus comprising:

the electrophotographic photoreceptor according to claim 10;

a charging unit that charges a surface of the electrophotographic photoreceptor;

an electrostatic latent image forming unit that forms an electrostatic latent image on the charged surface of the electrophotographic photoreceptor;

a developing unit that develops the electrostatic latent image on the surface of the electrophotographic photoreceptor by using a developer containing a toner so as to form a toner image; and a transfer unit that transfers the toner image onto a surface of a recording medium.

* * * * *